(12) United States Patent
Dhammawat et al.

(10) Patent No.: US 12,089,090 B2
(45) Date of Patent: Sep. 10, 2024

(54) CONFIGURATION AND USE OF ALLOCATED BANDWIDTHS FOR PREDEFINED SERVICE CLASSIFICATIONS ASSOCIATED WITH PREDEFINED TYPES OF A COMMUNICATION RESOURCE AT A USER PLANE FUNCTION NODE

(71) Applicant: Cisco Technology, Inc., San Jose, CA (US)

(72) Inventors: Abhishek Dhammawat, San Jose, CA (US); Srinath Gundavelli, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 85 days.

(21) Appl. No.: 17/329,863

(22) Filed: May 25, 2021

(65) Prior Publication Data
US 2022/0386179 A1    Dec. 1, 2022

(51) Int. Cl.
*H04W 28/24* (2009.01)
*H04W 28/02* (2009.01)
(Continued)

(52) U.S. Cl.
CPC ....... *H04W 28/24* (2013.01); *H04W 28/0268* (2013.01); *H04W 28/20* (2013.01); *H04L 47/2441* (2013.01)

(58) Field of Classification Search
None
See application file for complete search history.

(56) References Cited

U.S. PATENT DOCUMENTS

| | | |
|---|---|---|
| 8,194,698 B2 | 6/2012 | Senthilnathan et al. |
| 8,339,954 B2 | 12/2012 | Dahod |

(Continued)

FOREIGN PATENT DOCUMENTS

| | | |
|---|---|---|
| EP | 2959711 B1 | 9/2013 |
| WO | 2018049583 A1 | 3/2018 |

(Continued)

OTHER PUBLICATIONS

3GPP, "3rd Generation Partnership Project; Technical Specification Group Services and System Aspects; Study on system enhancements for user plane congestion management (Release 13)", 3GPP TR 23.705 V13.0.0, Dec. 2014, 61 pages.

(Continued)

*Primary Examiner* — Kodzovi Acolatse
*Assistant Examiner* — Anindita Sen
(74) *Attorney, Agent, or Firm* — Edell, Shapiro & Finnan, LLC

(57) ABSTRACT

In one illustrative example, a user plane function (UPF) node may receive, from a controller node, a configuration of an allocated bandwidth for a predefined service classification associated with different predefined types of a communication resource at the UPF node, for each one of a plurality of different predefined service classifications associated with different predefined types of the communication resource. The UPF node may monitor a total bandwidth usage for each predefined service classification. Based on identifying that the total bandwidth usage exceeds a threshold limit, the UPF node may send, to the controller node, a message which indicates a request for readjusting the allocated bandwidth for the predefined service classification, and indicating the total bandwidth usage. The different predefined types of the communication resource may be different network slices at (Continued)

the UPF node, or different Quality of Service (QoS) Flow resource types at the UPF node, as examples.

20 Claims, 28 Drawing Sheets

(51) Int. Cl.
*H04W 28/20* (2009.01)
*H04L 47/2441* (2022.01)

(56) References Cited

U.S. PATENT DOCUMENTS

| | | | | |
|---|---|---|---|---|
| 10,506,506 | B2* | 12/2019 | Qiao | H04W 8/18 |
| 10,667,256 | B2 | 5/2020 | Lake et al. | |
| 10,999,758 | B2 | 5/2021 | Dao | |
| 10,999,855 | B1 | 5/2021 | Singh et al. | |
| 11,297,550 | B2* | 4/2022 | Cirik | H04L 5/0048 |
| 11,438,049 | B2* | 9/2022 | Xu | H04W 16/28 |
| 11,438,791 | B1* | 9/2022 | Marupaduga | H04L 45/28 |
| 2010/0214916 | A1 | 8/2010 | Wu et al. | |
| 2010/0309927 | A1 | 12/2010 | Aubin et al. | |
| 2011/0205891 | A1 | 8/2011 | Kliger et al. | |
| 2013/0155849 | A1 | 6/2013 | Koodli et al. | |
| 2016/0218943 | A1* | 7/2016 | Djukic | H04L 43/0894 |
| 2018/0279161 | A1 | 9/2018 | Chen et al. | |
| 2019/0253917 | A1 | 8/2019 | Dao | |
| 2019/0342944 | A1 | 11/2019 | Chatterjee et al. | |
| 2019/0354406 | A1* | 11/2019 | Ganguli | G06F 9/45558 |
| 2020/0127799 | A1* | 4/2020 | Orsino | H04L 25/0226 |
| 2020/0236579 | A1 | 7/2020 | Cho et al. | |
| 2020/0259853 | A1* | 8/2020 | Alfano | H04L 63/1425 |
| 2020/0351409 | A1* | 11/2020 | Karampatsis | H04W 76/30 |
| 2021/0045091 | A1 | 2/2021 | Arora et al. | |
| 2021/0075631 | A1 | 3/2021 | Liao | |
| 2021/0136871 | A1* | 5/2021 | Bull | H04W 92/02 |
| 2021/0297891 | A1* | 9/2021 | Berzin | H04W 40/36 |

FOREIGN PATENT DOCUMENTS

| | | |
|---|---|---|
| WO | 2019158218 A1 | 8/2019 |
| WO | 2020020461 A1 | 1/2020 |
| WO | 2020034911 A1 | 2/2020 |
| WO | 2020173300 A1 | 9/2020 |

OTHER PUBLICATIONS

Jingya Li, et al. "An Overview of 5G System Accessibility Control and Differentiation", Dec. 10, 2020, 8 pages.
Cisco, "Cisco DNA Assurance User Guide, Release 1.3.1.0", Cisco Systems, Inc., Sep. 30, 2019, 166 pages.
Cisco, "Quality of Service Design Overview", Enterprise QoS Solution Reference Network Design Guide, downloaded from Internet May 25, 2021, 34 pages.
Tulja Vamshi Kiran Buyakar, et al., "Resource Allocation with Admission Control for GBR and Delay QoS in 5G Network Slices", Jan. 7, 2020, 8 pages.
Liveaction, "Cisco QoS Handbook", 2nd Edition, downloaded from Internet May 25, 2021, 58 pages.
Cisco, "Configure Policies", downloaded from Internet Aug. 21, 2020, 46 pages.
Cisco, "Ultra Cloud Core 5G User Plane Function, Release Jan. 2021—Configuration and Administration Guide", Cisco Systems, Inc., Jan. 29, 2021, 244 pages.
Cisco, "5G SMF Overview", downloaded May 25, 2021, 16 pages.
3GPP 5G, "LTE; 5G; Interface between the Control Plane and the User Plane nodes (3GPP TS 29.244 version 16.7.0 Release 16)," ETSI TS 129 244 V16.7.0, Apr. 2021, 326 pages.

* cited by examiner

FIG. 2A

| DNN | Example Services | Business Intent |
|---|---|---|
| Internet | SiP, RTP | enterprise relevant |
| Internet | Telepresence, Webex, Jabber, Facetime, Whatsapp | enterprise relevant |
| Internet | youtube | enterprise irrelevant |

| 5QI | Type Of Service | Resource Type | Default Priority Level | Packet Delay Budget | Category Of Services | Application ID / Name |
|---|---|---|---|---|---|---|
| 1 | Voice | GBR | 20 | 100 ms | Conversational voice | SiP, RTP |
| 2 | Conversational Video | GBR | 40 | 150ms | Conversational Video | Telepresence, Webex, Jabber, Facetime, Whatsapp |
| 6 | Buffered Video | Non GBR | 60 | 300ms | Video (Buffered Streaming) | Youtube |

| 5QI | QoS Policy | Application ID / Name |
|---|---|---|
| 1 | QoS Policy 1 | ID 1 |
| 2 | QoS Policy 2 | ID 2 |
| 6 | QoS Policy 3 | ID 3 |

200C

CONFIGURATION AND USE OF ALLOCATED BANDWIDTHS FOR PREDEFINED SERVICE CLASSIFICATIONS ASSOCIATED WITH PREDEFINED TYPES OF A COMMUNICATION RESOURCE AT A USER PLANE FUNCTION NODE

TECHNICAL FIELD

The present disclosure relates generally to telecommunication systems, and in particular, to techniques and mechanisms for configuration and use of allocated bandwidths for predefined service classifications associated with different predefined types of a communication resource at a user plane function node in a mobile network, such as an enterprise private Third Generation Partnership Project (3GPP) network.

BACKGROUND

An enterprise network deployment may include a Fifth Generation (5G) private network to provide "private 5G" for an enterprise. In enterprise deployments that involve mission-critical devices, Internet of Things (IoT) devices, and robotics, key considerations are reliability, low-latency, and application-specific Quality of Service (QoS) treatment.

Private 5G adopts the concept a QoS Flow from the basic 5G System (5GS) architecture defined in Third Generation Partnership Project (3GPP) standards. QoS Flows start at a User Plane Function (UPF) and extend to a gNodeB (gNB), and are mapped to radio bearers/QoS Flows at the gNB. Sessions of the UPF are managed by a Session Management Function (SMF) over an N4 interface using a Packet Forwarding Control Protocol (PFCP).

A QoS Flow represents a particular QoS classification and treatment on an application or Internet Protocol (IP) flow basis. A 5G QoS Identifier (5QI) is used to identify a specific QoS forwarding behavior for a QoS Flow (similar to a QoS Class Identifier "QCI" in an Long-Term Evolution "LTE" network). A QoS Flow may be associated with a Guaranteed Bit Rate (GBR), a Guaranteed Flow Bit Rate (GFBR), a Maximum Bit Rate (MBR), or a Packet Delay Budget (PDB), as examples. A GBR or GFBR bearer guarantees that a specific minimum bit rate is always available on that bearer.

For 5G communications, the bandwidth requirement is typically quite large. At the core network or UPF, system resources may be very limited. There are GBR QoS Flows in 5G that require high bandwidth, low latency and high throughput. The UPF may be unable to guarantee the GBR, GFBR or PDB for QoS Flows in a congestion or overload situation. Each system has its own system level capacity as well. To illustrate by example, if the data rate requirement per QoS Flow is one-hundred (100) megabits per second (MBPS) and the overall system limit is twenty (20) gigabits per second (GBPS), then the system can provide GBR for two-hundred (200) active QoS Flows at given time. How many active session/QoS Flows may be present at any given instant depends purely on the deployment model. Admission control in the SMF alone does not resolve the above-mentioned concerns, because it can limit the scale of UPF session capacity, as some high-bandwidth UEs may attach but not necessarily utilize the bandwidth at any given time.

The above issues may have a significant impact on the customer and deployment experience. As is apparent, over-subscription of bandwidth and congestion define real, practical problems to solve in relation to the UPF.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 2A is a table for representing a mapping of associations between applications, data networks, and business intents of the private 5G network, which may be provided from a network controller to the control plane function of the private 5G network;

FIG. 2B is a table for representing a mapping of associations between a plurality of application IDs/names associated with applications and a plurality of 5G Quality of Service (QoS) Identifiers (5QIs) associated with QoS policies;

FIG. 2C is a more simplified table for representing a mapping of associations between a plurality of application IDs/names associated with applications and a plurality of 5QIs associated with QoS policies;

DESCRIPTION OF EXAMPLE EMBODIMENTS

Figure 1A:
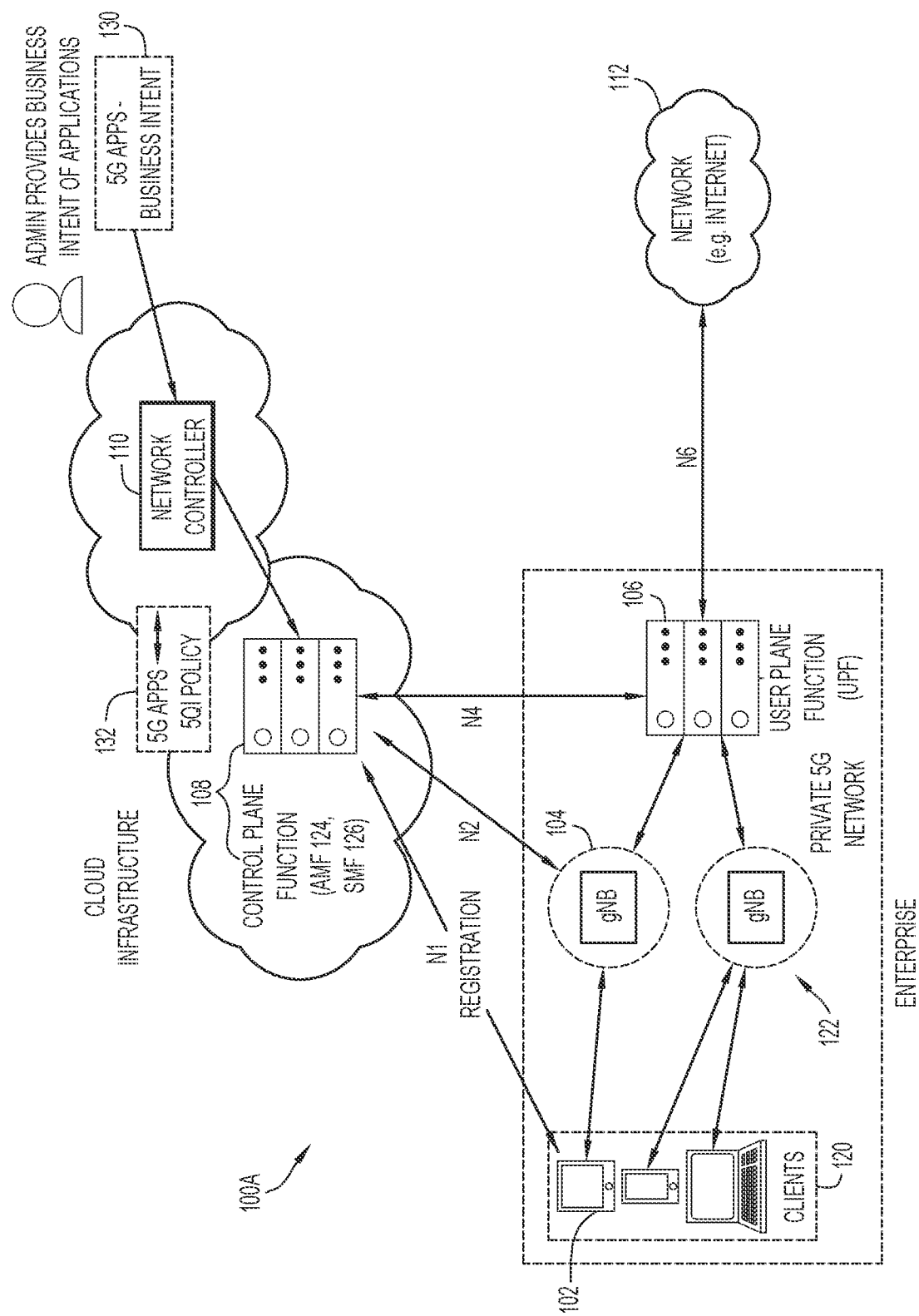
FIG. 1A is an illustrative representation of a basic network architecture of an enterprise private Third Generation Partnership Project (3GPP) network, which is (more specifically) a private Fifth Generation (5G) network, which may include a user plane function (UPF) and a control plane function which may be or include a session management function (SMF)

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Techniques and mechanisms for configuration and use of allocated bandwidths for predefined service classifications associated with different predefined types of a communication resource at a user plane function node in a mobile network are described herein. The mobile network may be a Third Generation Partnership Project (3GPP) based mobile network, such as a Fifth Generation (5G) network or, more specifically, an enterprise private 5G network.

In one illustrative example, a user plane function (UPF) node may receive, from a controller node, a configuration of an allocated bandwidth for a predefined service classification associated with different predefined types of a communication resource at the UPF node, for each one of a plurality of different predefined service classifications associated with different predefined types of the communication resource. The UPF node may monitor a total bandwidth usage for each predefined service classification, consumed from simultaneously-maintained Quality of Service (QoS) flows routed via the UPF node. Based on identifying that the total bandwidth usage exceeds a threshold limit, the UPF node may send, to the controller node, a message which indicates a request for readjusting the allocated bandwidth for the predefined service classification, and indicating the total bandwidth usage. The different predefined types of the communication resource may be different network slices at the UPF node, or different Quality of Service (QoS) Flow resource types at the UPF node, as examples.

More detailed and alternative techniques and implementations are provided herein as described below.

Example Embodiments

As described earlier in the Background section, an enterprise network deployment may include an enterprise private Third Generation Partnership project (3GPP) based network, such as a private Fifth Generation (5G) network for "private 5G." Such enterprise deployments may have mission-critical devices, Internet of Things (IoT) devices, and/or robotics devices, where application-specific Quality of Service (QoS) treatment, low latency, and reliability are key considerations.

To better illustrate, FIG. 1A is an illustrative representation of a network architecture 100A of an enterprise private 3GPP network for an enterprise, which is, more specifically, a private 5G network. Relatedly, FIG. 1B shows a network architecture 100B of the private 5G network of FIG. 1A as a simplified, schematic block diagram.

Figure 1B:
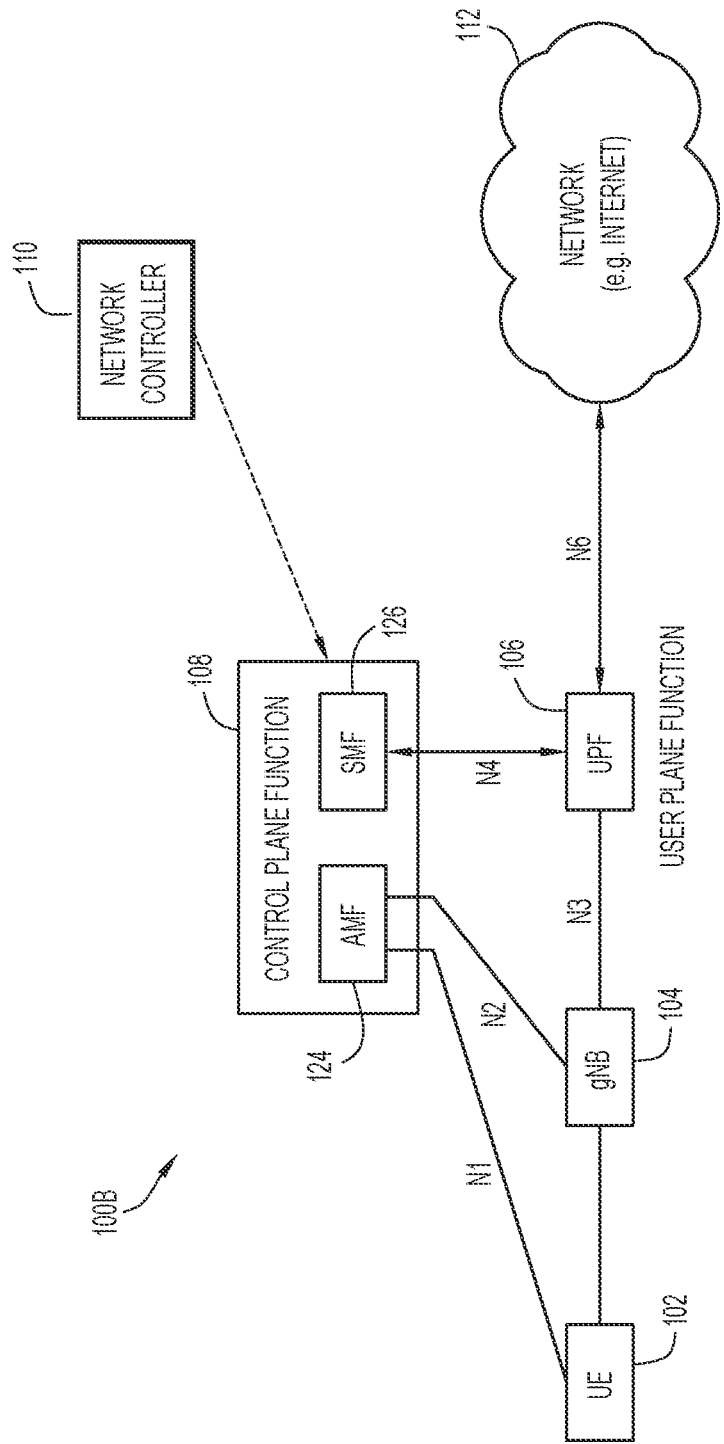
FIG. 1B shows the network architecture of the private 5G network of FIG. 1A as a simplified, schematic block diagram.

The private 5G network may utilize the network architecture 100A/100B in FIGS. 1A-1B to facilitate communications for a plurality of clients 120 or user equipment (UEs), such as a UE 102. UE 102 may be any suitable type of device, such as a cellular telephone, a smart phone, a tablet device, an IoT device, a Machine-to-Machine (M2M) device, a robotics device, and a sensor, to name but a few. UE 102 may obtain access to the private 5G network via one or more base stations or gNodeBs (gNBs) 122, such as a gNB 104. A user plane function (UPF) 106 (or user plane function node 106 or UPF node 106 as referenced elsewhere in the disclosure) may be used to carry traffic for an application for UE 102. For example, UPF 106 may carry uplink (UL) and downlink (DL) traffic between UE 102 operating in the private 5G network and a network 112, such as the Internet.

A control plane function(s) 108 of a control plane may be utilized in the 5G private network for access and mobility management, session management, and/or policy management and control, etc., for UEs. In particular, control plane function 108 may include an Access and Mobility Management Function (AMF) 124 and a Session Management Function (SMF) 126, as well as other 3GPP 5G System (5GS) defined functions (some or all of which may be enabled). AMF 124 and SMF 126 (as well as other 5GS-defined functions) may be implemented as separate functions or components, or alternatively provided together as an integrated functionality (in whole or in part) and/or co-located at the same node or component. A session at UPF 106 may be managed by SMF 126 over an N4 interface using a Packet Forwarding Control Protocol (PFCP). In some implementations, control plane function 108 is provided locally in the private 5G network. In other implementations, control plane function 108 is provided as part of a cloud infrastructure.

Operation, functionality, and protocols utilized in the private 5G network may at least generally conform to 3GPP standards for 5G (e.g. 3GPP Technical Specifications or "TS" 23.501 and 23.502), except where adapted and described herein according to the present disclosure. A plurality of interfaces and/or reference points N1, N2, N3, N4, and N6 shown in FIGS. 1A-1B (and others) may represent the communications and/or protocols between each of the entities, as is known by the relevant (evolving) standards documents.

A network controller 110 may also be provided for managing the private 5G network. More particularly, network controller 110 may be provided in the private 5G network for managing and controlling policy and configuration in the private 5G network. In some implementations, network controller 110 is provided locally in the private 5G network. In other implementations, network controller 110 is provided as part of a cloud infrastructure. In one example, the cloud infrastructure having network controller 110 may be referred to as a cloud controller, a cloud manager, or a network management cloud controller.

In some implementations, network controller 110 in the cloud infrastructure is operative to provide management and control over policy and configuration according to intent-based networking. The motivation of intent-based networking is to enable a user to describe in plain language what he or she wants to accomplish (e.g. the user's intent) and have the network translate the user's objective into configuration and policy changes that are automatically propagated across a heterogeneous computing environment. An intent-based network operates to abstract network complexity, automate much of the work of provisioning and managing the network typically handled by a network administrator, and assure secure operation and optimal performance of the network. In some implementations, network controller 110 in the cloud infrastructure may be or include a Cisco Digital Network Architecture (Cisco DNA™)

Private 5G adopts the concept of a QoS Flow from the standard 5GS architecture. A QoS Flow starts at UPF 106 and extends to gNB 104, where it is mapped to a radio bearer/QoS Flow to UE 102. Each QoS Flow is associated with a particular QoS classification and treatment on an Internet Protocol (IP) or application flow basis. A 5G QoS Identifier (5QI) is used to identify a specific QoS forwarding behavior for a QoS Flow. A QoS Flow may be associated with a Guaranteed Bit Rate (GBR), a Guaranteed Flow Bit Rate (GFBR), a Maximum Bit Rate (MBR), or a Packet Delay Budget (PDB), as examples. A GBR or GFBR bearer guarantees that a specific minimum bit rate is always available on that bearer.

For 5G communications, the bandwidth requirement is typically quite large. There are GBR QoS Flows in 5G that require high bandwidth, low latency and high throughput. Such GBR-type QoS Flows and associated radio bearers may be considered to be premium resources, especially in a limited private network. At the core network or UPF 106, system resources may be very limited. Unfortunately, congestion or overload in the network may result in undesirable packet drops and QoS degradation. In some cases, UPF 106 may be unable to guarantee the GBR, GFBR or PDB for QoS Flows due to congestion and overload.

Each system has its own system level capacity. To illustrate by example, if the data rate requirement per QoS Flow is one-hundred (100) megabits per second (MBPS) and the overall system limit is twenty (20) gigabits per second (GBPS), then the system can provide GBR for two-hundred (200) active QoS Flows at given time. How many active session/QoS Flows may be present at any given instant depends purely on the deployment model. Admission control in the SMF alone does not resolve the above-mentioned concerns, because it can limit the scale of UPF session capacity, as some high-bandwidth UEs may attach but not necessarily utilize the bandwidth at any given time. The above issues may have a considerable impact on customer and deployment experience. As is apparent, over-subscription of bandwidth and congestion at the UPF are real, practical concerns that need to be addressed.

To help alleviate some of these concerns, QoS Flow management procedures that provide at least some control and/or management at the UPF are available. The QoS Flow management procedures may include a "UPF-triggered QoS Flow creation procedure" and a "UPF-triggered QoS Flow deletion procedure" for optimizing use of QoS resources in the mobile network. Here, a UPF may keep an active monitoring of QoS Flows (e.g. those associated with one of a GBR, GFBR, or PDB), keeping active only those QoS Flows which have traffic activity, and deleting QoS Flows that are detected to have traffic inactivity. In one example, the UPF may determine that a measured time period of traffic inactivity for a dedicated QoS Flow is outside a limit set by a time period threshold, and send to the SMF a request for deleting the dedicated QoS Flow based on the determining. When traffic is again received for an application for a UE for which no current dedicated QoS Flow exists, the UPF may send a request for creating a dedicated QoS Flow for the traffic with the proper QoS.

With such QoS Flow management procedures, what may be utilized for proper QoS treatment is a mapping of stored associations between a plurality of application identifiers (IDs) and/or names of applications (e.g. "5G applications") and 5QIs and/or corresponding QoS profiles (as well as other relevant information, if and as needed). This mapping may be stored at and/or used by the control plane function (e.g. the SMF). With reference back to FIG. 1A, it is illustrated that information for 5G applications may be input to (e.g. by a network administrator) and sent from network controller 110 to control plane function 108 for use with the private 5G network. The information may include a mapping 130 of stored associations between applications, data networks, and business intents of the 5G private network. Control plane function 108 may obtain the information that includes mapping 130, and use this information to build or generate a mapping 132 of stored associations between a plurality of application IDs/names associated with the applications and a plurality of 5QIs associated with QoS profiles.

To better illustrate and explain, FIG. 2A is a table 200A for representing the mapping 130 of stored associations between applications, data networks, and business intents of the 5G private network. Mapping 130 may be provided from network controller 110 to control plane function 108 for use with the private 5G network (see FIG. 1A). In this example, mapping 130 may associate applications for various services with Data Network Names (DNN) and particular intents. As indicated, the various example services associated with the applications may include Session Initiation Protocol (SIP), Real-time Transfer Protocol (RTP), Telepresence, WebEx, Jabber, Facetime, WhatsApp, and YouTube. The business intents may include whether or not the service is enterprise relevant or enterprise irrelevant.

FIG. 2B is a table 200B for representing the mapping 132 of stored associations between a plurality of application IDs/names associated with the applications and a plurality of 5QIs (as well as additional information). Each one of the plurality of 5QIs may be associated with a respective one of a plurality of different QoS profiles. Mapping 132 of table 200B in FIG. 2B may be stored at control plane function 108 for use with the private 5G network (see FIG. 1A). In FIG. 2B, each entry for an application ID/name (e.g. SIP, RTP, Telepresence, WebEx, Jabber, Facetime, WhatsApp, or YouTube) may be associated with a unique 5QI and correspondingly a unique QoS profile, associated with a type of service (e.g. voice, conversational video, or buffered video), a resource type (e.g. GBR or non-GBR), a default priority level (e.g. 20, 40, or 60), a PDB (e.g. 100 ms, 150 ms, or 300 ms), and a category of service (conversational voice, conversational video, or video—buffered streaming.

FIG. 2C is a more simplified table 200C for representing the mapping 132 of stored associations between a plurality of application IDs/names (e.g. ID 1, ID 2, and ID 3 etc.) associated with applications and a plurality of 5QIs (e.g. 1, 2, 6, etc.) associated with the QoS profiles. Mapping 132 in table 200C of FIG. 2C may be stored at control plane function 108 for use with the private 5G network (see FIG. 1A). Again, each of the plurality of 5QIs (e.g. 1, 2, 6, etc.) may be associated with a respective one of a plurality of different QoS profiles (e.g. QoS profile 1, QoS profile 2, QoS profile 3, etc.).

Each QoS profile and flow may be associated with a QoS Flow Identifier (QFI). A QoS profile may be or include a plurality of QoS parameters, for example: a 5QI; an Allocation and Retention Priority (ARP); for each Non-GBR QoS Flow, a Reflective QoS Attribute (RQA); for each GBR QoS Flow, a GFBR (for UL and DL), and a Maximum Flow Bit Rate (MFBR) (for UL and DL); in the case of a GBR QoS Flow, a notification control, and a Maximum Packet Loss Rate (for UL and DL).

Techniques and mechanisms for configuration and use of allocated bandwidths for predefined service classifications associated with different predefined types of a communication resource at a UPF in a mobile network, such as an enterprise private 5G network, are described herein. The techniques and mechanisms of the present disclosure may be utilized with or without the above-mentioned QoS Flow management procedures that provide at least some level of control by the UPF.

More particularly, what are defined are new different "levels" for QoS bandwidth allocation at a UPF, so that an operator or administrator may be able to better configure and control various bandwidth allocations at the UPF. The allocated bandwidth that is configured may be utilized to monitor and/or to place limitations on the bandwidth or throughput consumption from simultaneously-maintained QoS Flows at the user plane function node. QoS Flows that are simultaneously-maintained at the UPF may be those that are configured at the UPF for packet flow processing (e.g. QoS classification and treatment) at a given time or timeframe, regardless of whether their associated packet flows are active or inactive. The configuration and control over the various bandwidth allocations at the UPF may be for better maintaining service for critical services and applications. In some implementations, configuration and control may be achieved with use of a control plane function which is or includes an SMF. In other implementations, configuration and control may be achieved with use of a network management cloud controller, DNAC automation, or other management entity process. In yet other implementations, configuration and control may be achieved with use of a control plane function (e.g. including an SMF) and a network management cloud controller (e.g. DNAC automation, or other management entity process).

In some particular implementations, the UPF be configured with different allocated bandwidths or throughput limits at newly-defined, multiple different "levels":

(1) UPF LEVEL (or NODE/SYSTEM LEVEL);
(2) NETWORK SLICE/DNN LEVEL;
(3) SERVICE GROUP LEVEL; and
(4) SERVICE LEVEL.

The different new levels for bandwidth allocation may be utilized for UPF monitoring of bandwidth usage, UPF detection of usage exceeding the bandwidth limit, and adjustment of bandwidth allocation at the UPF. Thus, a better segregation of resources for enabling proper QoS bandwidth/resource allocation, especially for critical service applications, may be achieved.

(1) UPF LEVEL (or NODE/SYSTEM LEVEL). Configurations of allocated bandwidths at the different "UPF levels" may involve different sets of parameters (e.g. bandwidth allocation value(s), threshold(s), and/or priority(s)) for multiple UPFs, as in the following:

UPF1==>BW1, THR1, PRI1
UPF2==>BW2, THR2, PRI2
UPF3==>BW3, THR3, PRI3
ETC.

Here, the UPF may maintain bandwidth allocation value(s), threshold(s), and/or priority(s) at the UPF level, and monitor the (real-time) actual bandwidth usage at each UPF level for detecting if the usage has exceeded the threshold for the UPF level. When exceeded, the UPF may communicate an indication and/or usage for readjusting the bandwidth allocation of the UPF level, as instructed via the control plane function (e.g. the SMF) (e.g. the call flow of FIG. 16 described later) or the network management cloud controller (e.g. the call flow of FIG. 17 described later). Thus, what are provided are reservations of bandwidths for different UPFs, nodes, or systems. Each UPF level may, in turn, have multiple network slices/DNNs and its associated levels (e.g. Network Slice/DNN levels below), with bandwidth allocation value(s), threshold(s), and/or priority(s) across its peers (e.g. network slice 1, network slice 2, etc.).

(2) NETWORK SLICE/DNN LEVEL. Configurations of allocated bandwidths at the different "network slice/DNN levels" may involve different sets of parameters (e.g. bandwidth allocation value(s), threshold(s), and/or priority(s)) for multiple network slices/DNNs, as in the following:

NTWKSLICE1/DNN1==>BW1, THR1, PRI1
NTWKSLICE2/DNN2==>BW2, THR2, PRI2
NTWKSLICE3/DNN3==>BW3, THR3, PRI3
ETC.

Here, the UPF may maintain bandwidth allocation value(s), threshold(s), and/or priority(s) at the network slice/DNN level, and monitor the (real-time) actual bandwidth usage at each network slice/DNN level, for detecting if the usage has exceeded the threshold for the network slice/DNN level. When exceeded, the UPF may communicate an indication and/or the usage for readjusting the bandwidth allocation of the network slice/DNN level, as instructed via the control plane function (e.g. the SMF) (e.g. the call flow of FIG. 16 described later) or the network management cloud controller (e.g. the call flow of FIG. 17 described later). Thus, what are provided are reservations of bandwidths for (all services or QoS Flows in) the different network slices or DNNs. Different network slices may be provided or allocated with their respective bandwidth from the UPF level. Each network slice/DNN level may, in turn, have multiple service group levels (e.g. Service Group levels below) with their respective priority and thresholds (e.g. Service Group 1, Service Group 2, etc.)

(3) SERVICE GROUP LEVEL. Configurations of allocated bandwidths at the different "service group" levels may utilize different sets of parameters (e.g. bandwidth allocation value(s), threshold(s), and/or priority(s)) for multiple service groups, as in the following:

SVCGRP1==>BW1, THR1, PRI1
SVCGRP2==>BW2, THR2, PRI2
SVCGRP3==>BW3, THR3, PRI3
ETC.

Here, the UPF may maintain bandwidth allocation value(s), threshold(s), and/or priority(s) at the service group level, and monitor the (real-time) actual bandwidth usage at each service group level for detecting if the usage has exceeded the threshold. When exceeded, the UPF may communicate an indication and/or the usage for readjusting the bandwidth allocation of the service group level, as instructed via the control plane function (e.g. the SMF) (e.g. the call flow of FIG. 16 described later) or the network management cloud controller (e.g. the call flow of FIG. 17 described later). In some implementations, a service group level may refer to a predefined QoS Flow resource type, such as: Service Group GBR—Group of GBR QoS Flow types—these types may have higher priority than the non GBR types; and Service Group Non-GBR—Group of Non-GBR QoS Flow types.

(4) SERVICE LEVEL—Configurations of allocated bandwidths at the different "service" levels may utilize different sets of parameters (e.g. bandwidth allocation value(s), threshold(s), and/or priority(s)) for multiple service levels, as in the following:

SVC1==>BW1, THR1, PRI1
SVC2==>BW2, THR2, PRI2
SVC3==>BW3, THR3, PRI3
ETC.

Here, the UPF may maintain bandwidth allocation value(s), threshold(s), and/or priority(s) at the service level, and monitor the (real-time) actual bandwidth usage at each service level for detecting if the usage has exceeded the threshold for the service level. When exceeded, the UPF may communicate an indication and/or the usage for readjusting the bandwidth allocation of the service level, as instructed via the control plane function (e.g. the SMF) (e.g. the call flow of FIG. 16 described later) or the network management cloud controller (e.g. the call flow of FIG. 17 described later). In some implementations, a service level may refer to a particular GBR QoS Flow type level.

With respect to the particular implementations described above, the UPF may operate to perform monitoring, detection, communication, and readjustment. When monitoring, the UPF may maintain a list of the number of active GBR QoS Flows and how much bandwidth is being currently consumed for the QoS Flows at the different levels described above. This may include the real-time monitoring of bandwidth consumption at the various levels. The UPF may maintain the threshold limits and, whenever the actual bandwidth for critical service has exceeded the threshold configured with respect to the allocated limit, then the UPF may be instructed to readjust the bandwidth allocation. The UPF may be instructed to provide more quota to the critical service (e.g. based on the configured service priority or QoS priority level) whose threshold was reached; for a lower-priority service(s), the bandwidth allocation may also be readjusted (e.g. decreased). Such an "on-demand" bandwidth readjustment across services (or group of services) will help achieve better QoS treatment in many common scenarios. For example, in cases where many GBR QoS Flows are not active, bandwidth at the system level will be available for non-GBR or less-critical QoS Flows. Also for example, if a customer wants to prioritize one service over another, even though the service may have the same QoS priority level, a network slice/DNN for a service may be configured at a higher priority.

Further regarding the particular implementations described above, the network management cloud controller may operate to perform configuration, communication, and readjustment at the UPF. In some implementations, the network management cloud controller (e.g. a DNAC) may be able to configure the information at the UPF (e.g. the bandwidth, threshold limits, and/or priority levels) for each of the above-mentioned levels or categories. The UPF may communicate the exceeding bandwidth usage and/or indication to the network management cloud controller for receiving a readjustment of the bandwidth from the DNAC (see e.g. the call flow of FIG. 17 described later). As an illustrative example, the UPF may send to the network management cloud controller an event notification or alert/alarm in response to detecting the actual bandwidth usage for the critical service has exceeded the threshold. Based on receiving the event notification or alert/alarm, the network management cloud controller (e.g. a "5G assurance application") may send to the UPF a suggested bandwidth readjustment to be made at the UPF at the appropriate level, so that the critical service receives an adequate bandwidth readjustment or re-allocation from a lower-priority service (s). The network management cloud controller may communicate these readjustments as a reallocated bandwidth configuration push for readjustment of the bandwidth at the UPF at the appropriate level (see e.g. the call flow of FIG. 17 described later).

In further respect to the particular implementation described above, the control plane function or SMF may similarly operate to perform configuration, communication, and readjustment at the UPF. Here, for example, the UPF may communicate the exceeding bandwidth usage and/or indication to the SMF for receiving a readjustment of the bandwidth from the SMF (see e.g. the call flow of FIG. 16 described later). As an illustrative example, when the UPF detects that packets are being dropped or threshold limit is being exceeded for a high-priority Protocol Data Unit (PDU) session (e.g. a high-speed session) at a particular level or category, the UPF may notify the SMF to allocate bandwidth from a lesser-used or lower priority resource of the level or category. This way, the limited system bandwidth may be advantageously dynamically managed at UPF. For the above, a PFCP Node Report Request message may be enhanced to include a list of levels or categories and associated bandwidth usages (e.g. for GBR QoS Flows). In response, the SMF may send to the UPF a PFCP Node Report Response message for allocating a new, additional bandwidth that is being reallocated from the particular level or category having less actual usage (to the level or category whose PDU sessions at the UPF are experiencing bandwidth limits and experiencing communications that exceed the threshold) (see e.g. the call flow of FIG. 16 described later).

The techniques and mechanisms of the present disclosure may provide important advantages, as they solve real deployment concerns regarding the allocation and prioritization of UPF system resources (e.g. for critical service application flows), especially useful for managing congestion or over-subscription conditions. As mentioned previously, admission control procedures are unable to resolve these issues since such control can limit the scale of UPF session capacity, as some high bandwidth UEs may attach but not necessarily utilize the bandwidth at a given time.

The above-described particular implementations of the present disclosure are now described more generally in relation to FIGS. 3A-3C, 4-6, 7A-7C, 8A-8C, and 9-15.

As described above, an allocated bandwidth that is configured for a given predefined service classification may be utilized to monitor and/or to place limitations on the bandwidth or throughput consumption from simultaneously-maintained QoS Flows associated with the predefined service classification. QoS Flows that are simultaneously-maintained at the UPF may be those that are configured at the UPF for packet flow processing (e.g. QoS classification and treatment) at a given time or timeframe, regardless of whether their associated packet flows are active or inactive. In some implementations, the consumption from simultaneously-maintained QoS Flows for a predefined service classification may include consumption from bandwidth reservations or guarantees (e.g. associated with GBR-types). In some implementations, the consumption from the simultaneously-maintained QoS Flows for a predefined service classification may be or include the actual consumption from simultaneously-maintained active QoS Flows which have one or more active packet flows. In some implementations, the consumption from simultaneously-maintained QoS Flows associated with a given predefined service classification may be a real-time measured/estimated consumption of the simultaneously-maintained QoS Flows for the predefined service classification. In other implementations, the consumption from simultaneously-maintained QoS Flows associated with a given predefined service classification may be an averaged measured/estimated consumption of the simultaneously-maintained QoS Flows for the predefined service classification.

Figure 3A:
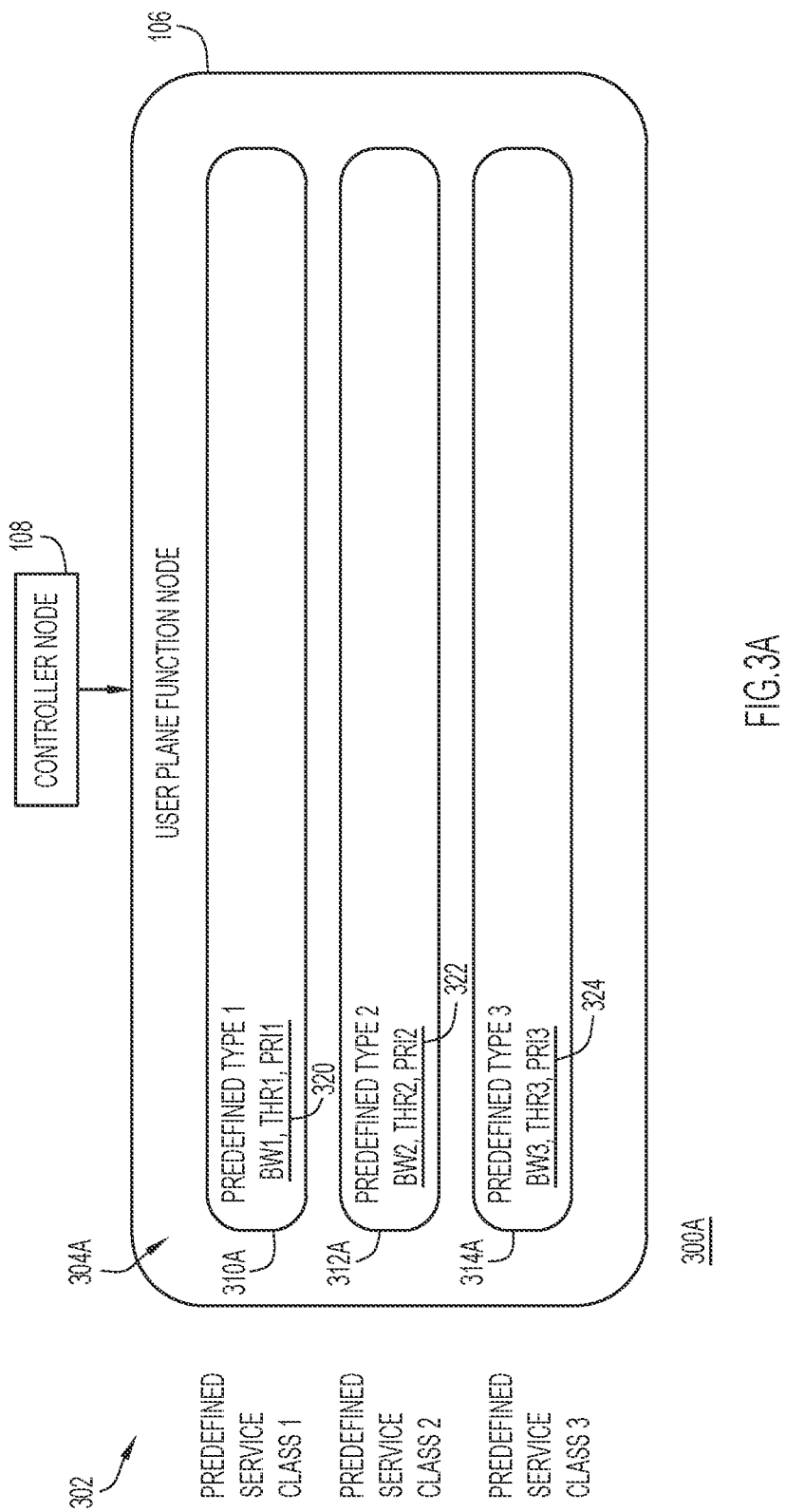
FIG. 3A is an illustrative representation of a system that includes a user plane function node having configurations of allocated bandwidths for predefined service classifications associated with different predefined types of a communication resource at the user plane function node according to some implementations of the present disclosure.

FIG. 3A is an illustrative representation of a system 300A that includes user plane function node 106 configured with allocated bandwidths for a plurality of predefined service classifications 302 respectively associated with different predefined types 304A of a communication resource. In the example of FIG. 3A, the plurality of predefined service classifications 302 include predefined service classifications 1, 2, and 3 associated with different predefined types 304A of a resource, including predefined types 310A, 312A, and 314A, respectively, of the resource. In FIG. 3A, each predefined service classification associated with the different predefined type of the resource may be associated with a set of parameters related to the allocated bandwidth configured in user plane function node 106. In some implementations, the set of parameters may include one or more of an allocated bandwidth value, a threshold limit value, and a priority value. In some implementations, each one of some or all of these parameters may be a relative value or percentage value. As indicated in the example of FIG. 3A, the predefined service classification 1 associated with predefined type 310A of the resource may have a configuration of a parameter set 320 that includes an allocated bandwidth value ("BW1"), a threshold limit value ("THR1"), and a priority value ("PRI1") as indicated. In addition, the predefined service classification 2 associated with predefined type 312A of the resource may have a configuration of a parameter set 322 that includes an allocated bandwidth value ("BW2"), a threshold limit value ("THR2"), and a priority value ("PRI2") as indicated. Finally, the predefined service classification 3 associated with predefined type 314A of the resource may have a configuration of a parameter set 324 that includes an allocated bandwidth value ("BW3"), a threshold limit value ("THR3"), and a priority value ("PRI3") as indicated.

Figure 3B:
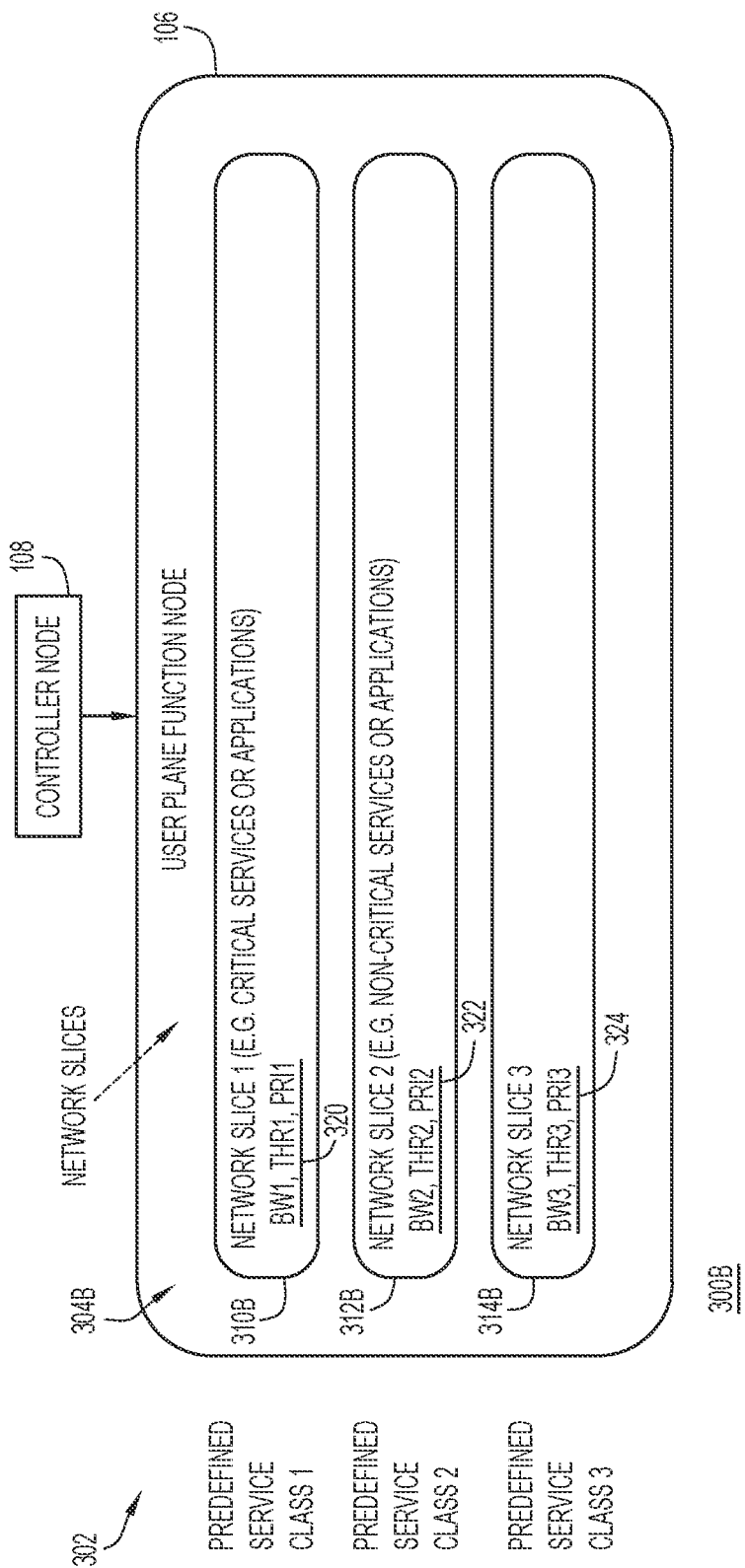
FIG. 3B is an illustrative representation of a system that includes a user plane function node of FIG. 3A, where the different predefined types of the communication resource are different network slices at the user plane function node according to some implementations of the present disclosure.

In some implementations of FIG. 3A, the different predefined types 304A of the communication resource are comprised of different network slices or DNNs associated with user plane function node 106. See, for example, a system 300B of FIG. 3B which illustrates different predefined types 304B comprised of different network slices 310B, 312B, and 314B at user plane function node 106. In the example of FIG. 3B, network slice 310B may be associated with critical services or applications and network slice 312B may be associated with non-critical services or applications.

Figure 3C:
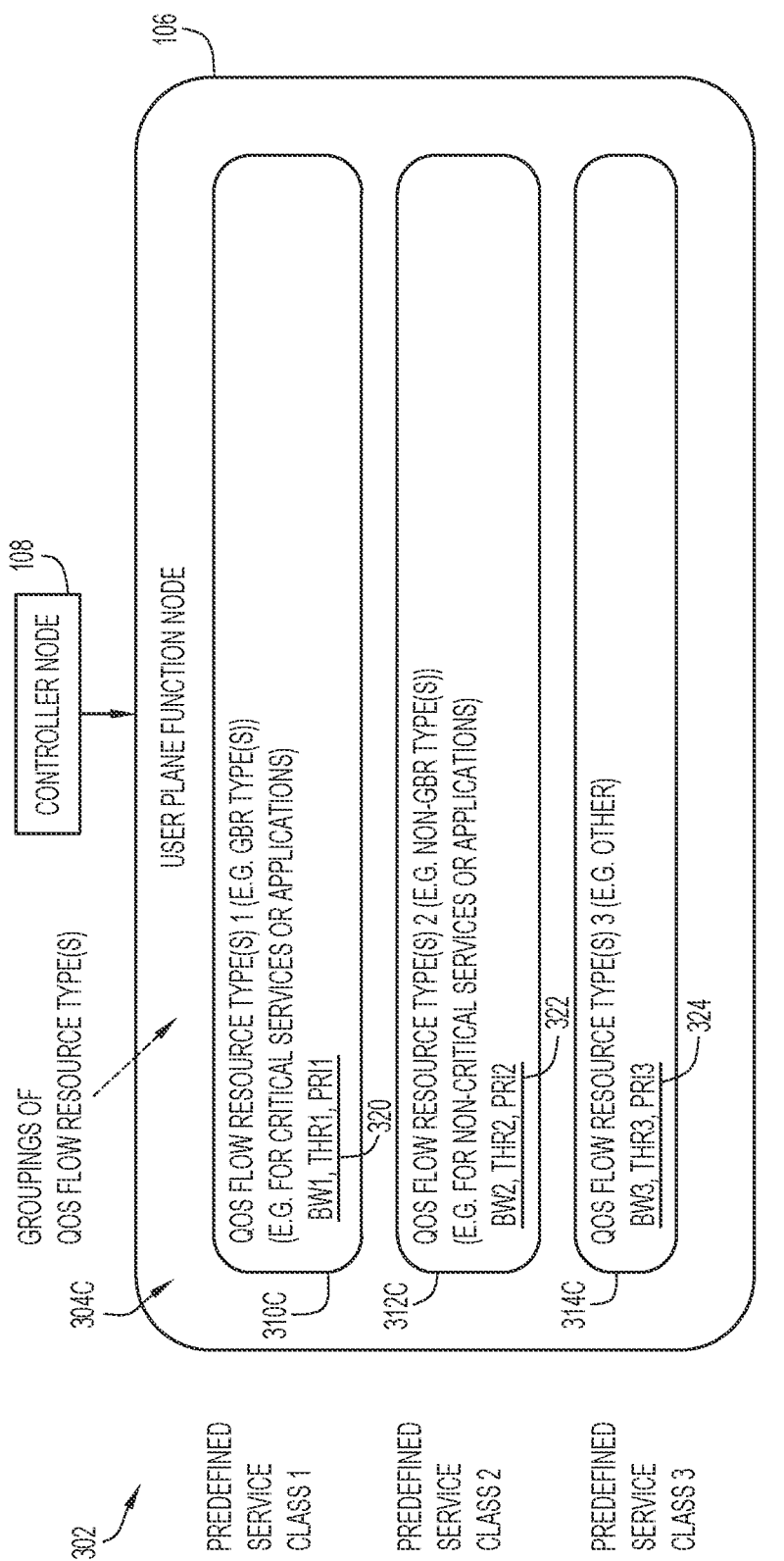
FIG. 3C is an illustrative representation of a system that includes a user plane function node of FIG. 3A, where the different predefined types of the communication resource are different QoS Flow resource types at the user plane function node according to some implementations of the present disclosure.

In some implementations of FIG. 3A, the different predefined types 304A of the communication resource are comprised of different QoS Flow resource types of QoS Flows at user plane function node 106. For example, the different QoS Flow resource types may include GBR types and non-GBR types. See, for example, a system 300C of FIG. 3C which illustrates different predefined types 304C of QoS Flows which include different QoS Flow resource types 310C, 312C, and 314C of QoS Flows (to be) routed via user plane function node 106. In the example of FIG. 3C, QoS Flow resource types 310C (e.g. GBR types) may be associated with critical services or applications and QoS Flow resource types 312C (e.g. non-GBR types) may be associated with non-critical services or applications.

Figure 4:
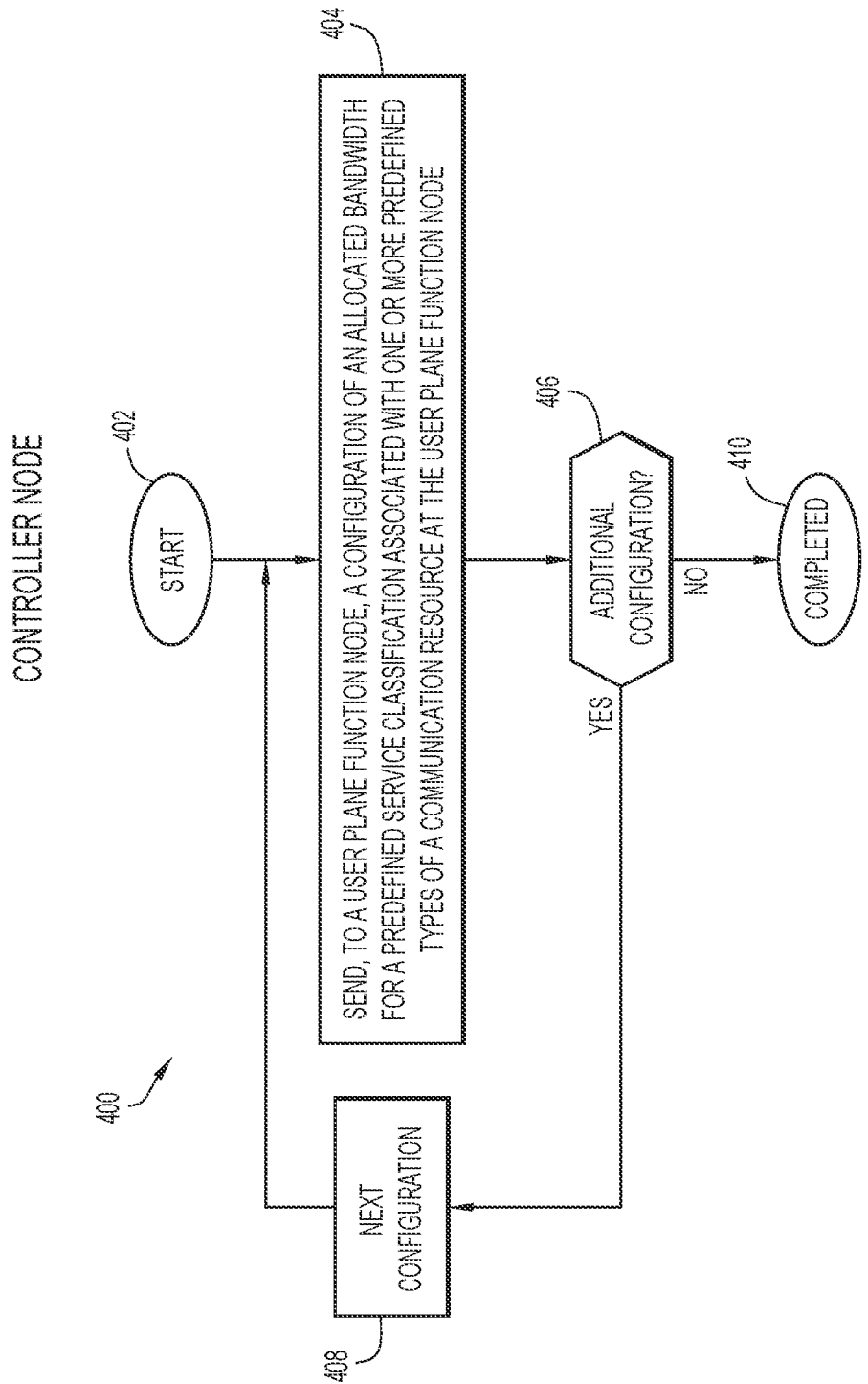
FIG. 4 is a flowchart for describing a method of a controller node for configuring allocated bandwidths for predefined service classifications associated with different predefined types of a communication resource at a user plane function node according to some implementations of the present disclosure.

FIG. 4 is a flowchart 400 for describing a method of a controller node for configuring allocated bandwidths for predefined service classifications associated with predefined types of a communication resource at a user plane function node according to some implementations of the present disclosure. The method of FIG. 4 may be performed for each one of a plurality of different predefined service classifications associated with one or more different predefined types of the communication resource. This method may be performed by a controller node (e.g. having SMF functionality, SMF and AIVIF functionality, or involve a network management cloud controller). The controller node may be a computing device or a network node configured to connect in a network for communication. In some implementations, the computing device or network node may include at least one or more interfaces configured to connect to a network for communication, one or more processors, one or more memory elements coupled to the one or more processors, and instructions stored in the one or more memory elements. The method may be embodied as a computer program product including a non-transitory computer readable medium (e.g. one or more memory elements) and instructions stored in the computer readable medium, where the instructions are executable on one or more processors for performing the steps of the method. In some implementations, the instructions stored in the one or more memory elements may be executable on the one or more processors for operation as described.

Beginning at a start block 402 of FIG. 4, the controller node may send, to a user plane function node, a configuration of an allocated bandwidth for a predefined service classification associated with one or more predefined types of a communication resource at the user plane function node (step 404 of FIG. 4). The allocated bandwidth that is configured may be utilized to monitor and/or to place limitations on the bandwidth or throughput consumption from simultaneously-maintained QoS Flows at the user plane function node. In some implementations, the configuration of allocated bandwidth for the predefined service classification may be associated with a set of parameters that are configured in the user plane function node. In some implementations, the set of parameters may include one or more of an allocated bandwidth value, a threshold limit value, and a priority value. In some implementations, each one of some or all of these parameters may be a relative value or percentage value. Step 404 may be performed for each one of a plurality of different predefined service classifications associated with one or more different predefined types of the communication resource. Accordingly, if there is an additional configuration to be performed (as identified at step 406 of FIG. 4), the controller node may identify or select the next configuration (step 408 of FIG. 4) and the send to the user plane function node the next configuration of allocated bandwidth for the next predefined service classification (again step 404 of FIG. 4). This procedure may be repeated until there are no more additional configurations (again as identified in step 406), where the method is completed (a completion step 410 of FIG. 4). In alternative implementations of the method of FIG. 4, the sending in step 404 may be a single step performed for all or some of the configurations associated with all or some the plurality of predefined service classifications.

In some implementations of FIG. 4, the different predefined types of the communication resource are comprised of different network slices or DNNs associated with the user plane function node. In some other implementations, the different predefined types of the communication resource are comprised of different QoS Flow resource types (e.g. including GBR types and non-GBR types) of QoS Flows at the user plane function node. In yet some other implementations, the different predefined types of the communication resource are comprised of different GBR QoS Flow types of QoS Flows at the user plane function node.

Figure 5:
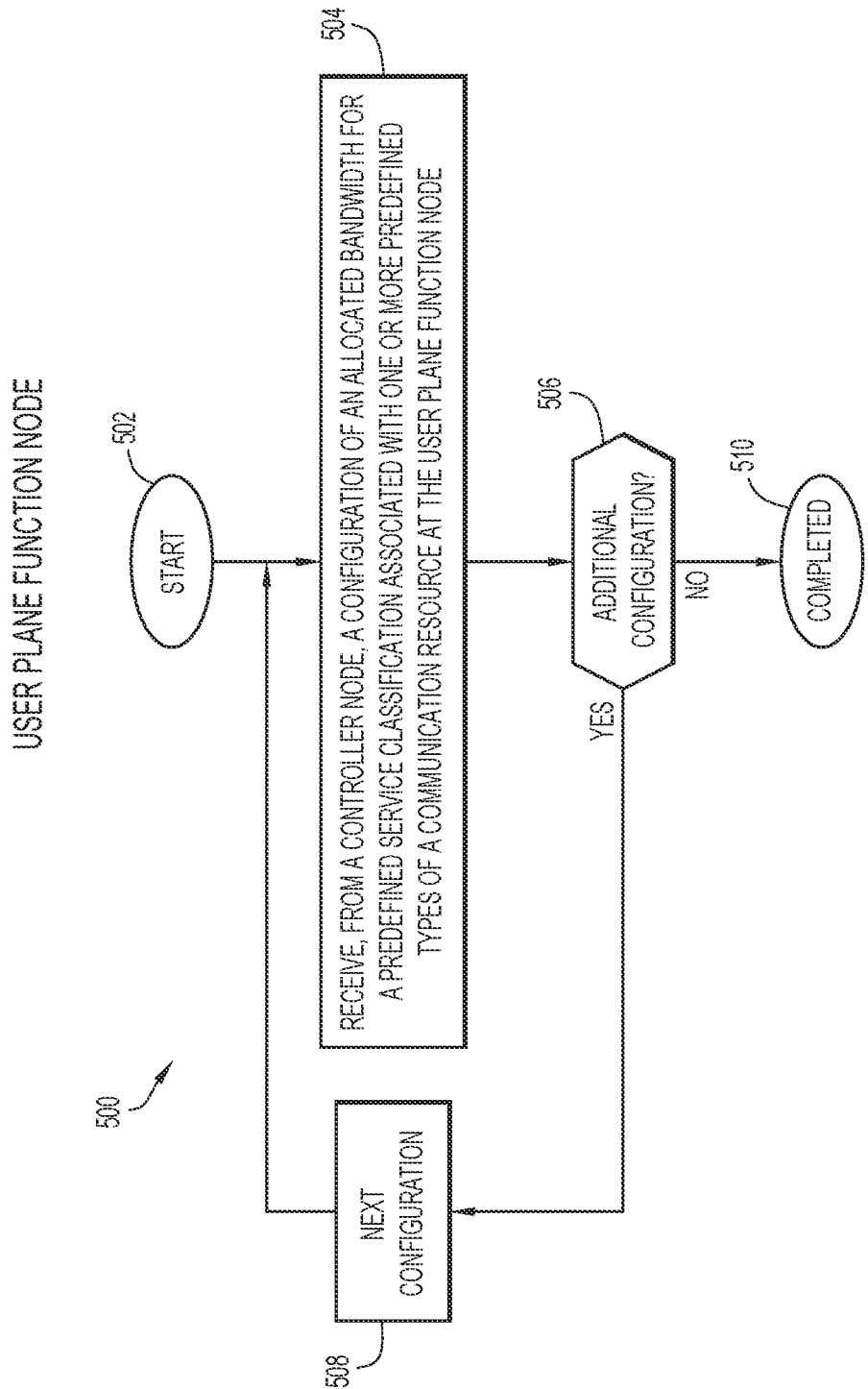
FIG. 5 is a flowchart for describing a method of a user plane function node for receiving configurations of allocated bandwidths for predefined service classifications associated with different predefined types of a communication resource at the user plane function node according to some implementations of the present disclosure.

FIG. 5 is a flowchart 500 for describing a method of a user plane function node for receiving configurations of allocated bandwidths for predefined service classifications associated with predefined types of a communication resource at the user plane function node. The method of FIG. 5 may be performed for each one of a plurality of different predefined service classifications associated with one or more different predefined types of the communication resource. This method may be performed by a user plane function node (e.g. having UPF functionality or the like). The user plane function node may be a computing device or a network node configured to connect in a network for communication. In some implementations, the computing device or network node may include at least one or more interfaces configured to connect to a network for communication, one or more processors, one or more memory elements coupled to the one or more processors, and instructions stored in the one or more memory elements. The method may be embodied as a computer program product including a non-transitory computer readable medium (e.g. one or more memory elements) and instructions stored in the computer readable medium, where the instructions are executable on one or more processors for performing the steps of the method. In some implementations, the instructions stored in the one or more memory elements may be executable on the one or more processors for operation as described.

Beginning at a start block 502 of FIG. 5, the user plane function node may receive, from a controller node, a configuration of an allocated bandwidth for a predefined service classification associated with one or more predefined types of a communication resource at the user plane function node (step 504 of FIG. 5). The allocated bandwidth that is configured may be utilized to monitor and/or to place limitations on the bandwidth or throughput consumption from simultaneously-maintained QoS Flows at the user plane function node. In some implementations, the configuration of allocated bandwidth for the predefined service classification may be associated with a set of parameters that are configured in the user plane function node. In some implementations, the set of parameters may include one or more of an allocated bandwidth value, a threshold limit value, and a priority value. In some implementations, each one of some or all of these parameters may be a relative value or percentage value. Step 504 may be performed for each one of a plurality of different predefined service classifications associated with one or more different predefined types of the communication resource. Accordingly, if there is an additional configuration (step 506 of FIG. 5), the next configuration may be identified or selected (step 508 of FIG. 5) and received (again step 504 of FIG. 5) at the user plane function node for the next configuration of allocated bandwidth for the next predefined service classification. This procedure may be repeated until there are no more additional configurations (again step 506), where the method is completed (a completion step 510 of FIG. 5). In alternative implementations of the method of FIG. 5, the receiving in step 504 may be a single step performed for all or some of the configurations associated with all or some the plurality of predefined service classifications.

In some implementations of FIG. 5, the different predefined types of the communication resource are comprised of different network slices or DNNs associated with the user plane function node. In some other implementations, the different predefined types of the communication resource are comprised of different QoS Flow resource types (e.g. including GBR types and non-GBR types) of QoS Flows at the user plane function node. In yet some other implementations, the different predefined types of the communication resource are comprised of different GBR QoS Flow types of QoS Flows at the user plane function node.

Figure 6:
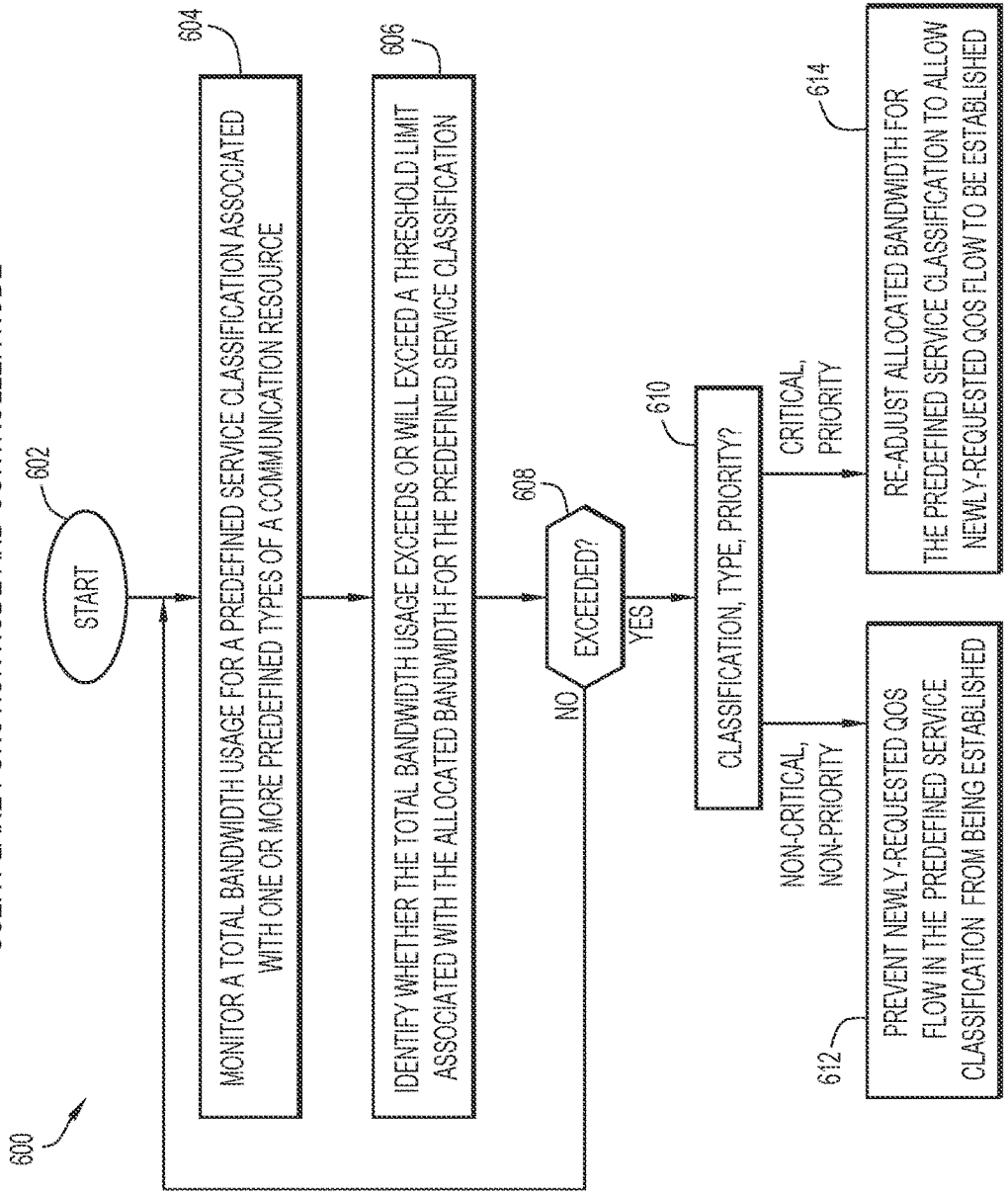
FIG. 6 is a flowchart for describing a method of a system including a controller node and a user plane function node for managing use of a communication resource at the user plane function node based on configurations of allocated bandwidths for different predefined service classifications according to some implementations of the present disclosure.

FIG. 6 is a flowchart 600 for describing a method for managing use of a communication resource at the user plane function node based on configurations of allocated bandwidths for different predefined service classifications according to some implementations of the present disclosure. The method of FIG. 6 may be performed for each one of a plurality of different predefined service classifications associated with one or more different predefined types of the communication resource (e.g. with use of parallel or serial processing). The method may be performed with use of a system including a controller node and a user plane function node, as described above.

Beginning at a start block 602 of FIG. 6, a total bandwidth usage for a predefined service classification associated with one or more predefined types of a communication resource at a user plane function node may be monitored (step 604 of FIG. 6). The total bandwidth usage that is monitored may be consumed from simultaneously-maintained QoS Flows routed via the user plane function node. The total bandwidth usage may be checked to identify whether it exceeds or will exceed a threshold limit associated with the allocated bandwidth for the predefined service classification (step 606 of FIG. 6). Based on identifying that the total bandwidth usage does not or will not exceed the threshold limit (as identified in step 608 of FIG. 6), the monitoring (again step 604) and the checking/identifying (again step 606) may be continued. Based on identifying that the total bandwidth usage does or will exceed the threshold limit (again as identified in step 608), the classification, type, and/or priority may be checked (step 610 of FIG. 6). If the classification, type, or priority is of a first type (e.g. associated with a non-critical service or application, and/or a non-priority service or application) (as identified in step 610), a newly-requested QoS Flow in the predefined service classification may be prevented from being established (step 612 of FIG. 6). If the classification, type, or priority is of a second type (e.g. associated with a critical service or application, and/or a priority service or application) (again as identified in step 610), the allocated bandwidth for the predefined service classification may be readjusted to allow a newly-requested QoS Flow in the predefined service classification to be established (step 614 of FIG. 6).

In some implementations of FIG. 6, the configuration of allocated bandwidth for the predefined service classification may be associated with a set of parameters that are configured in the user plane function node. In some implementations, this set of parameters may include one or more of an allocated bandwidth value, a threshold limit value, and a priority value. In some implementations, each one of some or all of these parameters may be a relative value or percentage value. In some implementations, one or more of these parameters may be utilized in step 606 and/or 608 for processing. Additionally, in some implementations, the different predefined types of the communication resource are comprised of different network slices at the user plane function node. In some other implementations, the different predefined types of the communication resource are comprised of different QoS Flow resource types (e.g. including GBR types and non-GBR types) of QoS Flows at the user plane function node. In yet some other implementations, the different predefined types of the communication resource are comprised of different GBR QoS Flow types of QoS Flows at the user plane function node.

Figure 7A:
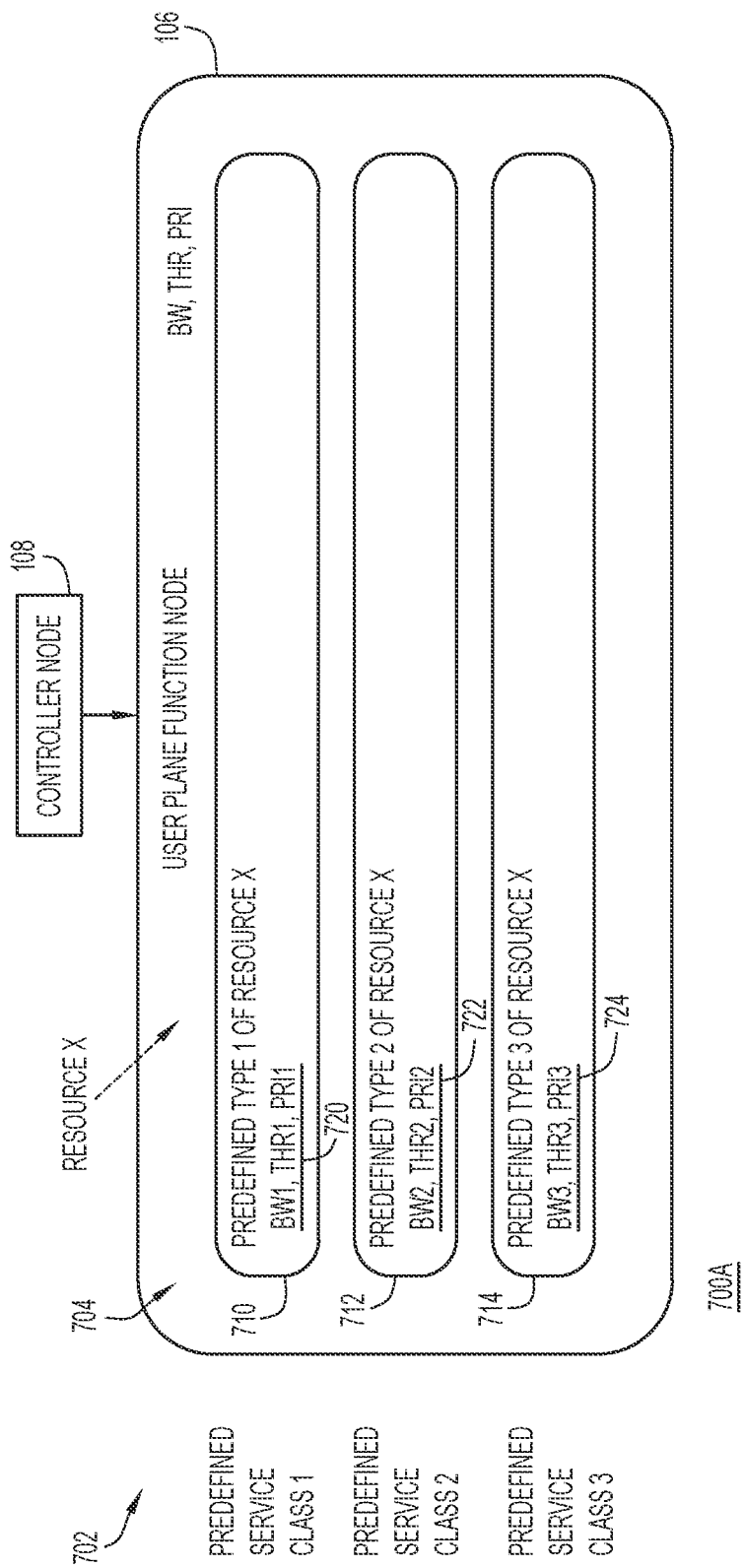
FIG. 7A is an illustrative representation of a system that includes a user plane function node having configurations of allocated bandwidths for predefined service classifications associated with different predefined types of a communication resource at the user plane function node according to some implementations of the present disclosure.

FIG. 7A is an illustrative representation of a system 700A that includes user plane function node 106 configured with allocated bandwidths for a plurality of predefined service classifications 702 respectively associated with different predefined types 704 of a communication resource. System 700A is similar to the configuration in system 300A of FIG. 3A described earlier. In the example of FIG. 7A, the plurality of predefined service classifications 702 include predefined service classifications 1, 2, and 3 associated with different predefined types 704 of "Resource X" that include predefined types 710, 712, and 714, respectively, of Resource X. In FIG. 7A, each predefined service classification associated with the different predefined type of Resource X may be associated with a set of parameters related to the allocated bandwidth configured in user plane function node 106. In some implementations, the set of parameters may include one or more of an allocated bandwidth value, a threshold limit value, and a priority value. In some implementations, each one of some or all of these parameters may be a relative value or percentage value.

As indicated in the example of FIG. 7A, the predefined service classification 1 associated with predefined type 710 of Resource X may have a configuration of a parameter set 720 that includes an allocated bandwidth value ("BW1"), a threshold limit value ("THR1"), and a priority value ("PRI1") as indicated. In addition, the predefined service classification 2 associated with predefined type 712 of Resource X may have a configuration of a parameter set 722 that includes an allocated bandwidth value ("BW2"), a threshold limit value ("THR2"), and a priority value ("PRI2") as indicated. Finally, the predefined service classification 3 associated with predefined type 714 of Resource X may have a configuration of a parameter set 724 that includes an allocated bandwidth value ("BW3"), a threshold limit value ("THR3"), and a priority value ("PRI3") as indicated.

Figure 7B:
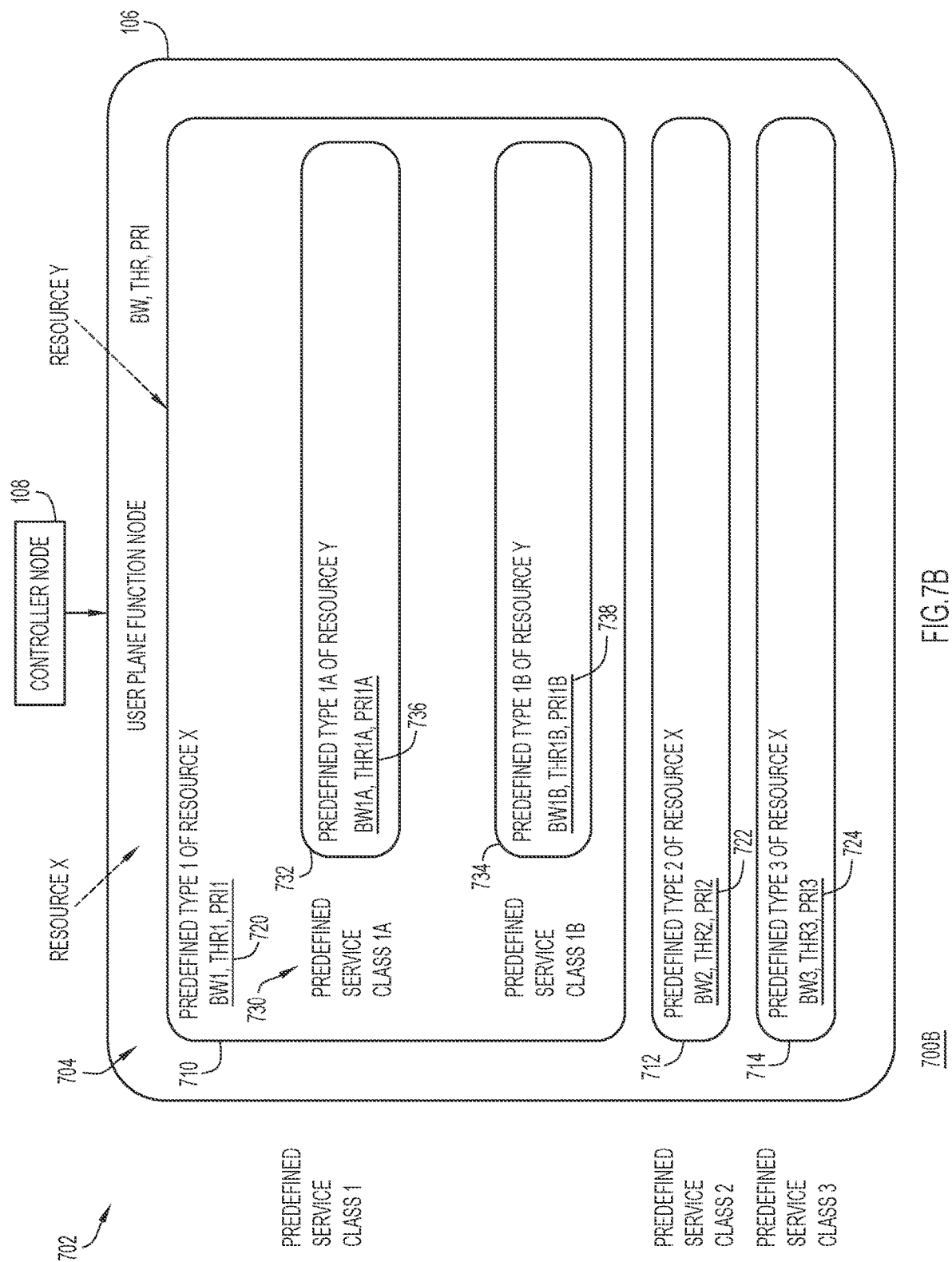
FIG. 7B is an illustrative representation of the system that includes the user plane function node of FIG. 7A, where each one of the predefined types of the communication resource may be divided into a plurality of predefined service subclassifications, and where each one of the predefined service subclassifications may be associated with one or more different predefined subtypes according to some implementations of the present disclosure.

In some implementations, each one of one or more of the predefined service classifications associated with its corresponding predefined type of the communication resource may be divided into a plurality of predefined additional service classifications or "subclassifications." These predefined service subclassifications may be respectively associated with different predefined subtypes of a different communication resource at the user plane function node. To illustrate with reference to FIG. 7B, a system 700B of FIG. 7B is the same as 700A of FIG. 7A, with the inclusion that predefined type 710 of Resource X is considered a new "Resource Y" that may be associated with such predefined service subclassifications. More particularly, in the example of FIG. 7B, a plurality of predefined service subclassifications 730 include predefined service classifications 1A and 1B associated with different predefined types 732 and 734, respectively, of Resource Y.

In FIG. 7B, each predefined service classification associated with the different predefined type 732 or 734 of Resource Y may be associated with a set of parameters related to its configured allocated bandwidth. In some implementations, the set of parameters may include one or more of an allocated bandwidth value, a threshold limit value, and a priority value. In some implementations, each one of some or all of these parameters may be a relative value or percentage value. As indicated in the example of FIG. 7B, the predefined service classification 1A associated with predefined type 732 of Resource Y may have a configuration of a parameter set 736 that includes an allocated bandwidth value ("BW1A"), a threshold limit value ("THR1A"), and a priority value ("PRI1A") as indicated. In addition, the predefined service classification 1B associated with predefined type 734 of Resource Y may have a configuration of a parameter set 738 that includes an allocated bandwidth value ("BW1B"), a threshold limit value ("THR1B"), and a priority value ("PRI1B") as indicated. The allocated bandwidths of these predefined types 732 and 734 (e.g. "BW1A" and "BW2A," respectively) may be allocated or divided from the total allocated bandwidth of Resource Y (e.g. "BW1").

Figure 7C:
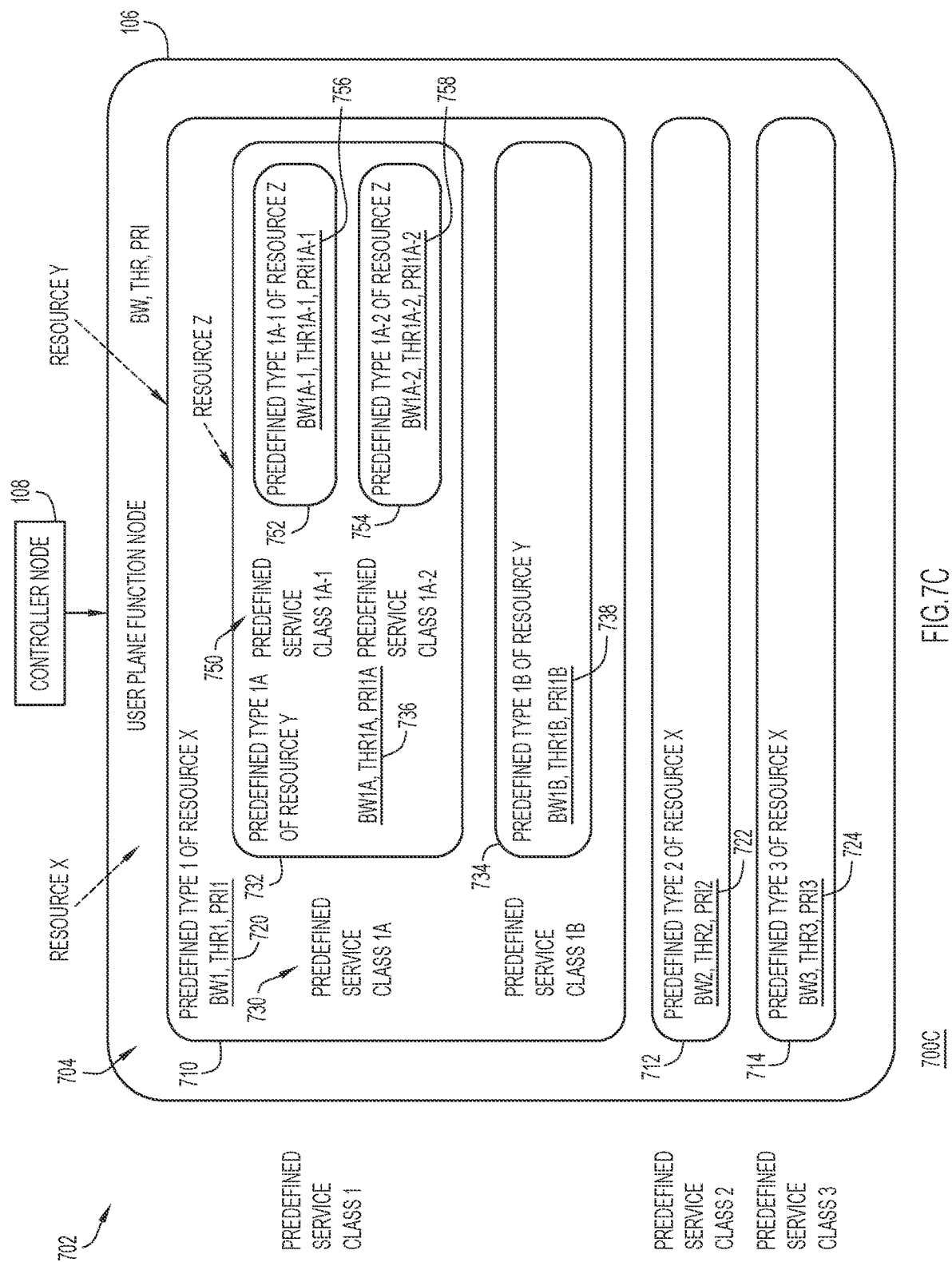
FIG. 7C is an illustrative representation of the system that includes the user plane function node of FIG. 7B, where each one of the predefined subtypes may be divided into a plurality of different predefined additional service subclassifications, and where each one of the predefined additional service subclassifications may be associated with one or more different predefined additional subtypes according to some implementations of the present disclosure.

In some further implementations of the above, each one of one or more of the predefined service subclassifications associated with its corresponding predefined subtype of the communication resource may be even further divided into a plurality of predefined additional service classifications or subclassifications. These predefined additional service subclassifications may be respectively associated with different predefined additional subtypes of an even different communication resource at the user plane function node. To illustrate with reference to FIG. 7C, a system 700C of FIG. 7C is the same as 700B of FIG. 7B, with the inclusion that predefined type 732 of Resource Y is considered a new "Resource Z" that may be associated with such predefined additional service subclassifications. More particularly, in the example of FIG. 7C, a plurality of predefined additional service subclassifications 750 include predefined service classifications 1A-1 and 1A-2 associated with different predefined types 752 and 754, respectively, of Resource Z.

In FIG. 7C, each predefined service classification associated with the different predefined type 752 and 754 of Resource Z may be associated with a set of parameters related to its configured allocated bandwidth. In some implementations, the set of parameters may include one or more of an allocated bandwidth value, a threshold limit value, and a priority value. In some implementations, each one of some or all of these parameters may be a relative value or percentage value. As indicated in the example of FIG. 7C, the predefined service classification 1A-1 associated with predefined type 752 of Resource Z may have a configuration of a parameter set 756 that includes an allocated bandwidth value ("BW1A-1"), a threshold limit value ("THR1A-1"), and a priority value ("PRI1A-1") as indicated. In addition, the predefined service classification 1A-2 associated with predefined type 754 of Resource Z may have a configuration of a parameter set 758 that includes an allocated bandwidth value ("BW1A-2"), a threshold limit value ("THR1A-2"), and a priority value ("PRI1A-2") as indicated. The allocated bandwidths of these predefined types 752 and 754 (e.g. "BW1A-1" and "BW2A-2," respectively) may be allocated or divided from the total allocated bandwidth of Resource Z (e.g. "BW1A").

Figure 8A:
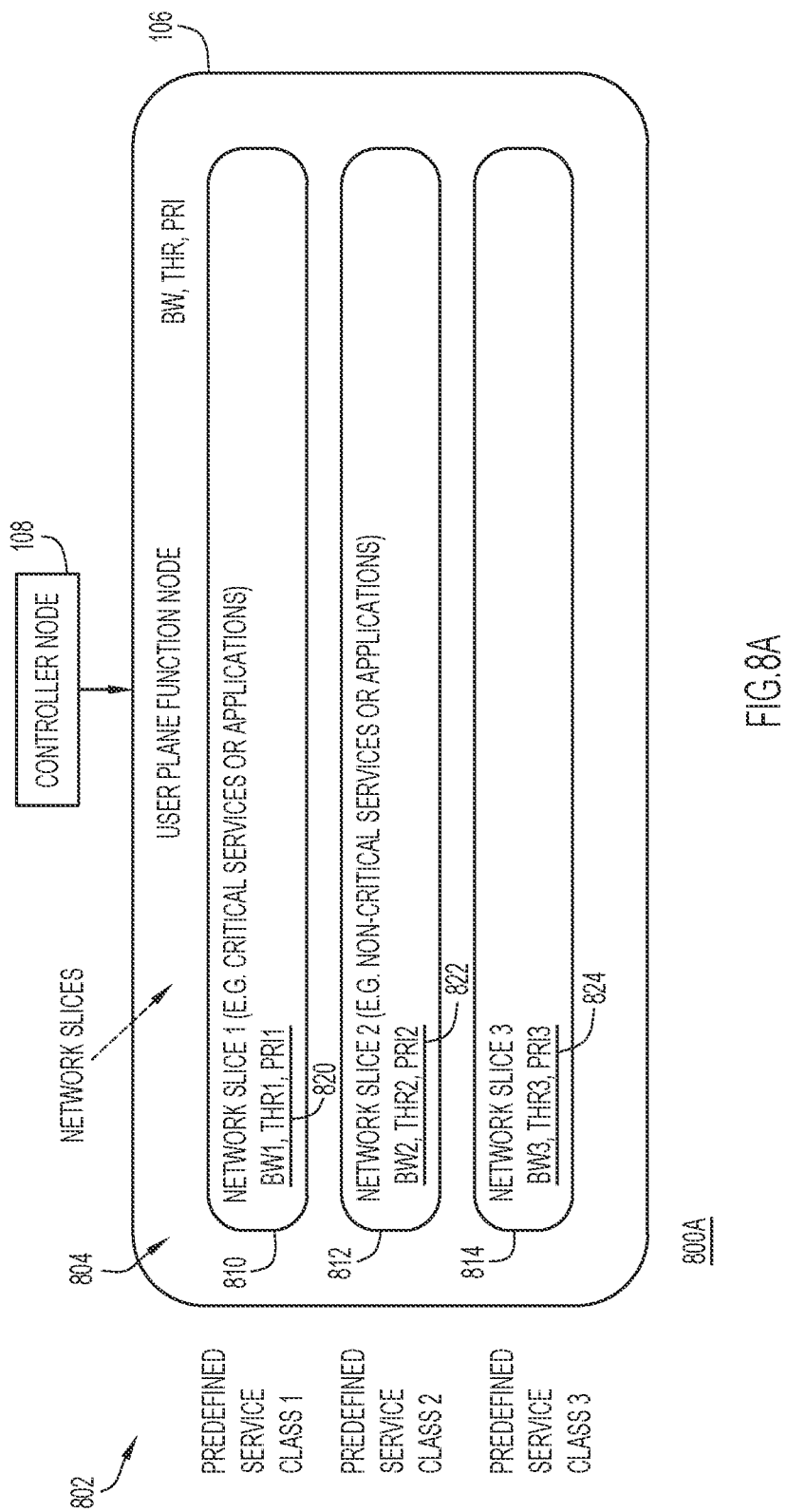
FIG. 8A is an illustrative representation of a system that includes a user plane function node having configuration of allocated bandwidths for predefined service classifications associated with different network slices or Data Network Names (DNNs) at the user plane function node according to some implementations of the present disclosure.
Figure 8B:
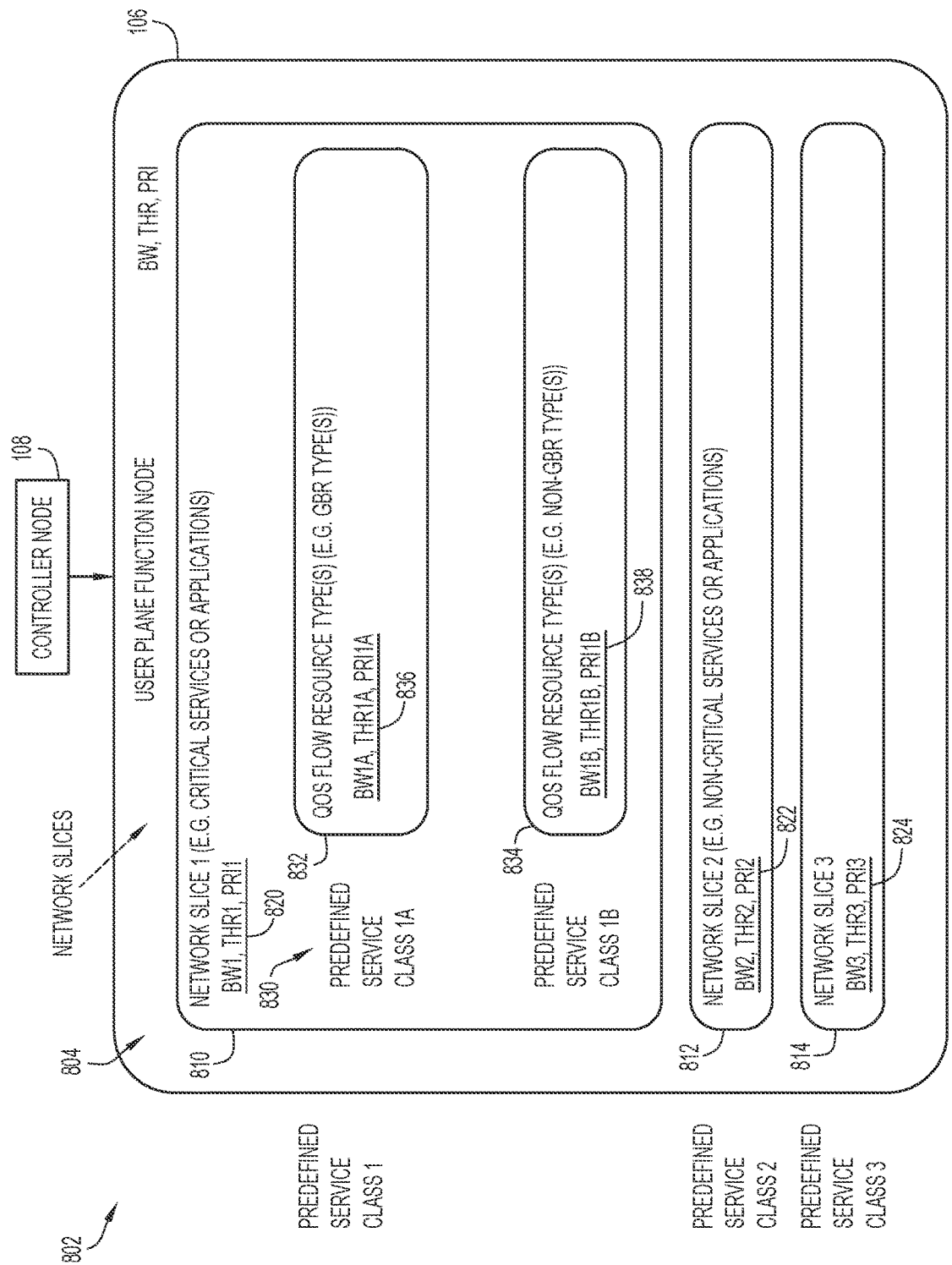
FIG. 8B is an illustrative representation of the system that includes the user plane function node of FIG. 8A, where each network slice may be divided into a plurality of different predefined service subclassifications, and where each one of the different predefined service subclassifications may be associated with different QoS Flow resource types (e.g. Guaranteed Bit Rate "GBR" types and non-GBR types) in the network slice according to some implementations of the present disclosure.
Figure 8C:
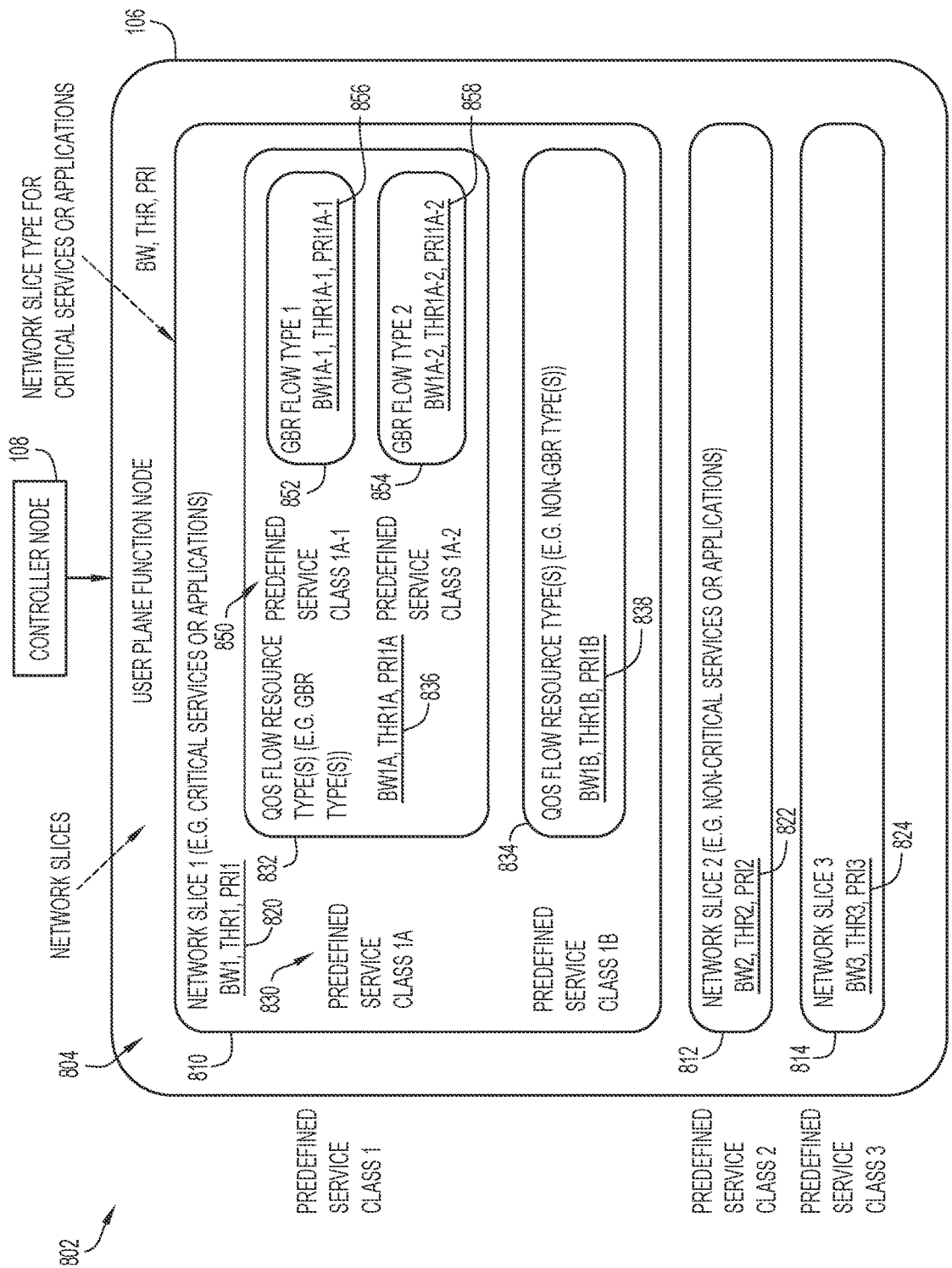
FIG. 8C is an illustrative representation of the system that includes the user plane function node of FIG. 8B, where each predefined QoS Flow resource type (e.g. GBR types and non-GBR types) may be divided into a plurality of different predefined additional service subclassifications, and where one of the different predefined additional service subclassifications may be associated with different GBR QoS Flow types, according to some implementations of the present disclosure.

With reference now to FIGS. 8A-8C, systems 800A-800C of FIGS. 8A-8C illustrate preferred implementations of the general implementations of systems 700A-700C of FIGS. 7A-7C described above. Description of systems 800A-800C of FIGS. 8A-8C of the preferred implementations are now provided.

FIG. 8A is an illustrative representation of a system 800A that includes user plane function node 106 configured with allocated bandwidths for a plurality of predefined service classifications 802 respectively associated with different predefined types 804 of a communication resource. System 800A is similar to the configuration in system 700A of FIG. 7A described earlier. In the example of FIG. 8A, the plurality of predefined service classifications 802 include predefined service classifications 1, 2, and 3 associated with different predefined types 804 comprised of different network slices 810, 812, and 814 (or DNNs), respectively, at user plane function node 106. In FIG. 8A, each predefined service classification associated with the different predefined type of Resource X may be associated with a set of parameters related to the allocated bandwidth configured in user plane function node 106. In some implementations, the set of parameters may include one or more of an allocated bandwidth value, a threshold limit value, and a priority value. In some implementations, each one of some or all of these parameters may be a relative value or percentage value. As indicated in the example of FIG. 8A, the predefined service classification 1 associated with network slice 810 (or a DNN1) may have a configuration of a parameter set 820 that includes an allocated bandwidth value ("BW1"), a threshold limit value ("THR1"), and a priority value ("PRI1") as indicated. In addition, the predefined service classification 2 associated with network slice 812 (or a DNN2) may have a configuration of a parameter set 822 that includes an allocated bandwidth value ("BW2"), a threshold limit value ("THR2"), and a priority value ("PRI2") as indicated. Finally, the predefined service classification 3 associated with network slice 814 (or a DNN3) may have a configuration of a parameter set 824 that includes an allocated bandwidth value ("BW3"), a threshold limit value ("THR3"), and a priority value ("PRI3") as indicated.

In some implementations, each one of one or more of the predefined service classifications associated with its corresponding network slice (or DNN) may be divided into a plurality of predefined additional service classifications or subclassifications. These predefined service subclassifications may be respectively associated with different predefined types of a different communication resource at the user plane function node. To illustrate with reference to FIG. 8B, system 800B of FIG. 8B is the same as 800A of FIG. 8A, with the inclusion that network slice 810 at user plane function node 106 is considered a new resource that may be associated with such predefined service subclassifications. More particularly, in the example of FIG. 8B, a plurality of predefined service classifications 830 include predefined service classifications 1A and 1B associated with different predefined QoS Flow resource types 832 and 834, respectively, of QoS Flows routed via network slice 810 (or to DNN1) at user plane function node 106. For example, different predefined QoS Flow resource types 832 and 834 of QoS Flows may include GBR types and non-GBR types, respectively.

In FIG. 8B, each predefined service classification associated with the different predefined QoS Flow resource types 832 or 834 may be associated with a set of parameters related to its configured allocated bandwidth. In some implementations, the set of parameters may include one or more of an allocated bandwidth value, a threshold limit value, and a priority value. In some implementations, each one of some or all of these parameters may be a relative value or percentage value. As indicated in the example of FIG. 8B, the predefined service classification 1A associated with predefined QoS Flow resource types 832 (e.g. the GBR QoS Flow types) may have a configuration of a parameter set 836 that includes an allocated bandwidth value ("BW1A"), a threshold limit value ("THR1A"), and a priority value ("PRI1A") as indicated. In addition, the predefined service classification 1B associated with predefined QoS Flow resource types 834 (e.g. the non-GBR QoS Flow types) may have a configuration of a parameter set 838 that includes an allocated bandwidth value ("BW1B"), a threshold limit value ("THR1B"), and a priority value ("PRI1B") as indicated. The allocated bandwidths of these predefined QoS Flow resource types 832 and 834 (e.g. "BW1A" and "BW2A," respectively) may be allocated or divided from the total allocated bandwidth of network slice 810 (e.g. "BW1").

In some further implementations, each one of one or more of the predefined service subclassifications associated with its corresponding QoS Flow resource type may be even further divided into a plurality of predefined additional service classifications or subclassifications. These predefined additional service subclassifications may be respectively associated with different predefined types of an even different communication resource at the user plane function node. To illustrate with reference to FIG. 8C, a system 800C of FIG. 8C is the same as 800B of FIG. 8B, with the inclusion that predefined QoS Flow resource types 832 (e.g. the GBR QoS Flow types) is considered an even new resource that may be associated with such predefined additional service subclassifications. More particularly, in the example of FIG. 8C, a plurality of predefined additional service classifications 850 include predefined service classifications 1A-1 and 1A-2 associated with different predefined GBR QoS Flow types 852 and 854, respectively, of QoS Flows.

In FIG. 8C, each predefined service classification associated with the different predefined GBR QoS Flow types 852 and 854 may be associated with a set of parameters related to its configured allocated bandwidth. In some implementations, the set of parameters may include one or more of an allocated bandwidth value, a threshold limit value, and a priority value. In some implementations, each one of some or all of these parameters may be a relative value or percentage value. As indicated in the example of FIG. 8C, the predefined service classification 1A-1 associated with predefined GBR QoS Flow types 852 may have a configuration of a parameter set 856 that includes an allocated bandwidth value ("BW1A-1"), a threshold limit value ("THR1A-1"), and a priority value ("PRI1A-1") as indicated. In addition, the predefined service classification 1A-2 associated with predefined GBR QoS Flow types 854 may have a configuration of a parameter set 858 that includes an allocated bandwidth value ("BW1A-2"), a threshold limit value ("THR1A-2"), and a priority value ("PRI1A-2") as indicated. The allocated bandwidths of these predefined GBR QoS Flow types 852 and 854 (e.g. "BW1A-1" and "BW2A-2," respectively) may be allocated or divided from the total allocated bandwidth of predefined QoS Flow resource types for GBR types (e.g. "BW1A").

Figure 9:
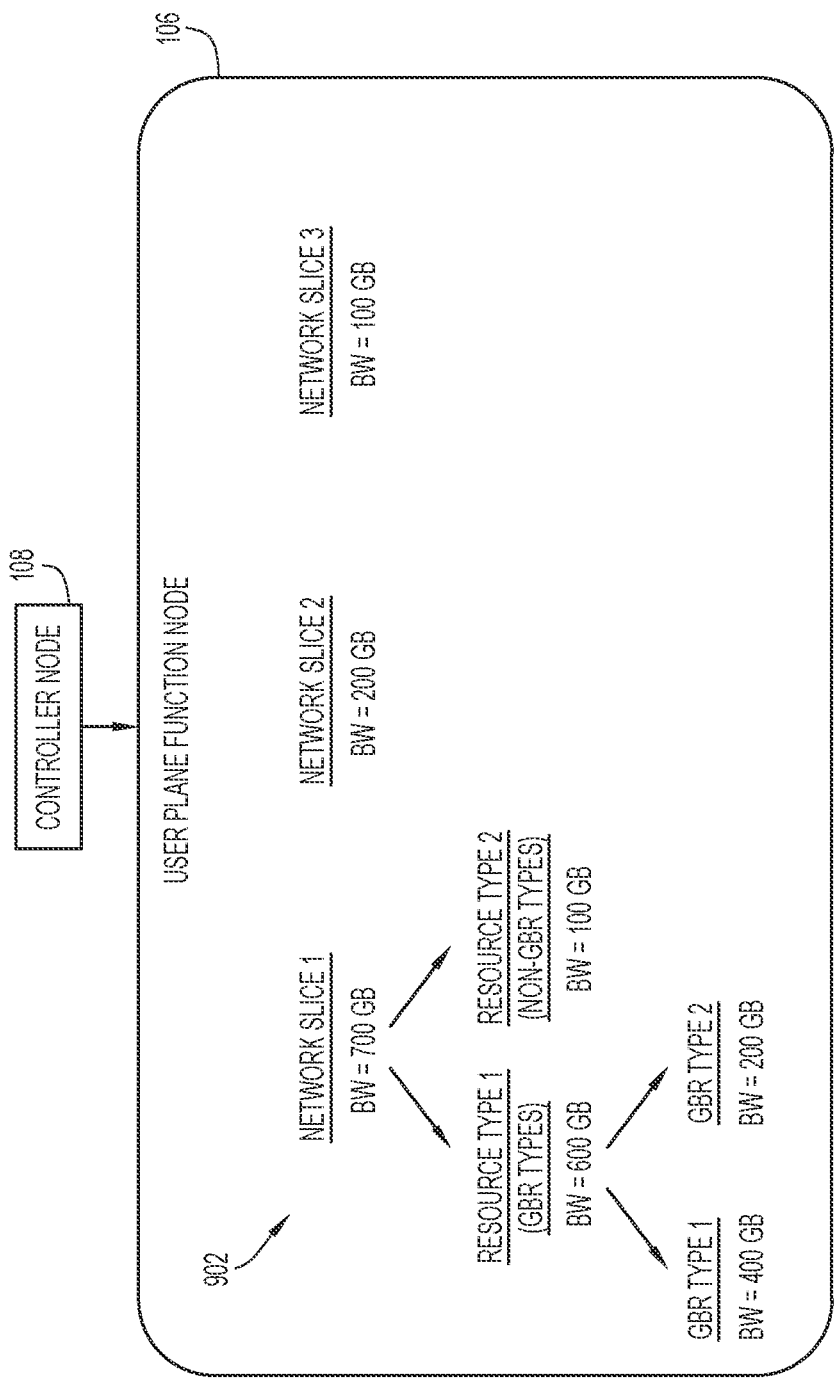
FIG. 9 is an illustrative representation of an example of allocated bandwidths at a user plane function node according to some implementations of the present disclosure.

FIG. 9 is an illustrative representation of an example of allocated bandwidths 902 at user plane function node according to some implementations. In the example of FIG. 9, the predefined service classifications are associated with different network slices or DNNs (e.g. allocations of Network Slice 1, Network Slice 2, and Network Slice 3 are at 700 GB, 200 GB, and 100 GB, respectively). Each different network slice or DNN may be associated with different QoS Flow resource types (e.g. allocations of Resource Type 1—GBR types and Resource Type 2—Non-GBR types are at 600 GB and 100 GB, respectively, for Network Slice 1). Each different QoS Flow resource type may be associated with different GBR types (e.g. allocations of GBR Type 1 and GBR Type 2 are at 400 GB and 200 GB, respectively, for Resource Type 1— GBR types).

As described earlier above, the techniques and mechanisms of the present disclosure may be utilized with or without QoS Flow management procedures that provide at least some level of control and/or management by the UPF (see e.g. the call flows in relation to FIGS. 18-20 described later below). Considering the different control and management arrangements available, different techniques may be performed for control and/or management of allocated bandwidths at the UPF. Accordingly, in light of the different control and management arrangements available, various methods are now described in relation to FIGS. 10-13 for the user plane function node and FIGS. 14-15 for the controller node according to the present disclosure.

FIGS. 10, 11, 12, and 13 are flowcharts 1000, 1100, 1200, and 1300, respectively, for describing various methods of a user plane function node for managing use of a communication resource at the user plane function node based on configurations of allocated bandwidths for different predefined service classifications according to some implementations of the present disclosure. Each one of the methods of FIGS. 10-13 may be performed for each one of a plurality of different predefined service classifications associated with one or more different predefined types of the communication resource (e.g. with use of parallel or serial processing). The methods may be performed by a user plane function node, with use of a system including a controller node and the user plane function node. In some implementations of these methods, the configuration of allocated bandwidth for the predefined service classification may be associated with a set of parameters that are configured in the user plane function node, which may include one or more of an allocated bandwidth value, a threshold limit value, and a priority value; each one of some or all of these parameters may be a relative value or percentage value. In some implementations, the different predefined types of the communication resource at the user plane function node are comprised of different network slices at the user plane function node. In some other implementations, the different predefined types of the communication resource at the user plane function node are comprised of different QoS Flow resource types (e.g. including GBR types and non-GBR types) of QoS Flows at the user plane function node. In yet some other implementations, the different predefined types of the communication resource at the user plane function node are comprised of different GBR QoS Flow types of QoS Flows at the user plane function node.

Figure 10:
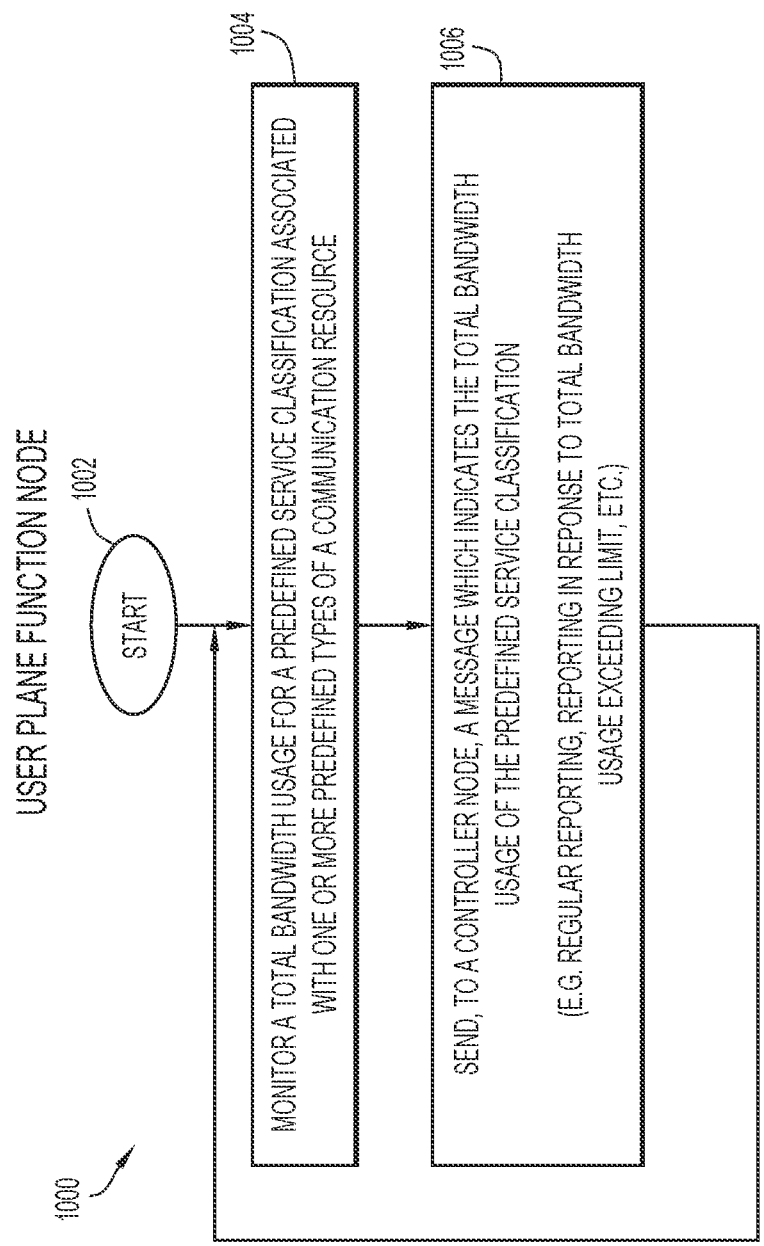
FIGS. 10, 11, 12, and 13 are flowcharts for describing methods of a user plane function node for managing use of a communication resource at the user plane function node based on configurations of allocated bandwidths for different predefined service classifications according to some implementations of the present disclosure.

In the flowchart 1000 of FIG. 10, at a start block 1002, the user plane function node may monitor a total bandwidth usage for a predefined service classification associated with one or more predefined types of a communication resource at a user plane function node (step 1004 of FIG. 10). The total bandwidth usage that is monitored may be consumed from simultaneously-maintained QoS Flows routed via the user plane function node, and may be a real-time bandwidth usage. The user plane function node may send, to a controller node, a message which indicates the total bandwidth usage of the predefined service classification (step 1006 of FIG. 10). In some implementations, steps 1004 and 1006 may be repeated on a regular basis for a regular reporting of the regularly-monitored, total bandwidth usage. In some other implementations, the sending of the message in step 1006 may be performed (only) in response to the user plane function node identifying that the total bandwidth usage is identified to exceed or to become exceeded with respect to a threshold limit associated with the allocated bandwidth. The controller node may process the received total bandwidth usage from the user plane function node according to any suitable technique (e.g. the methods of FIGS. 14-15 described later). In some implementations of step 1006, the user plane function node may send one or more messages which indicate the total bandwidth usages of some of all of the predefined service classifications associated with some or all of the different predefined types of the communication resource (e.g. in a list), and/or including the total bandwidth usages of some or all of the predefined service subclassifications associated with some or all of the predefined subtypes (e.g. in a list).

Figure 11:
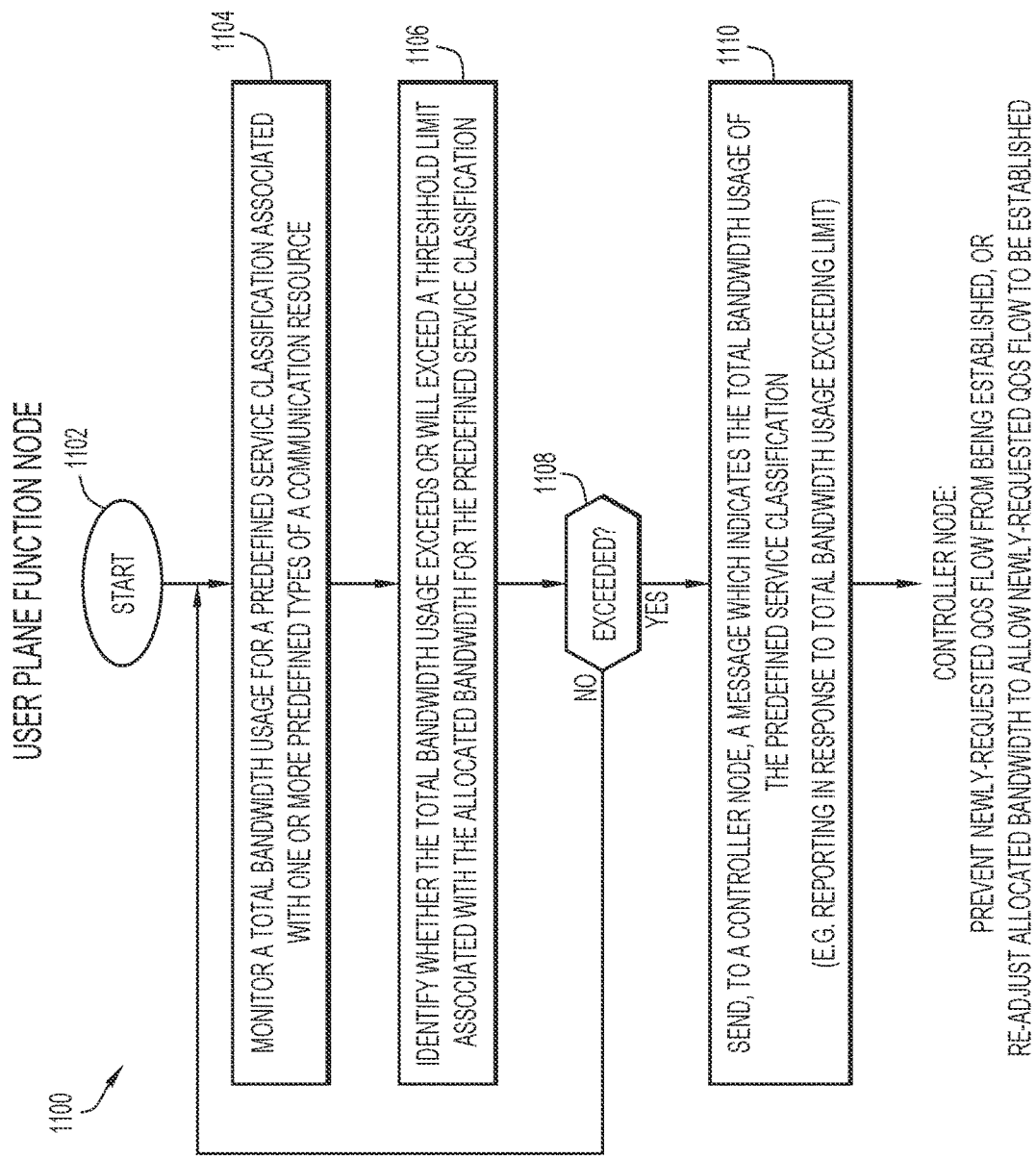

In the flowchart 1100 of FIG. 11, at a start block 1102, the user plane function node may monitor a total bandwidth usage for a predefined service classification associated with one or more predefined types of a communication resource at a user plane function node (step 1104 of FIG. 11). The total bandwidth usage that is monitored may be consumed from simultaneously-maintained QoS Flows routed via the user plane function node. The total bandwidth usage that is provided may be a real-time bandwidth usage. The user plane function node may check to identify whether the total bandwidth usage exceeds or will exceed a threshold limit associated with the allocated bandwidth for the predefined service classification (step 1106 of FIG. 11). Based on identifying that the total bandwidth usage does not or will not exceed the threshold limit (step 1108 of FIG. 11), the user plane function node may continue to monitor (again step 1104) and to check/identify (again step 1106). In repeated steps 1104 and 1106, the real-time total bandwidth usage may be monitored. Based on identifying that the total bandwidth usage does or will exceed the threshold limit (again step 1108), the user plane function node may send, to a controller node, a message which indicates the total bandwidth usage of the predefined service classification (step 1110 of FIG. 10). The controller node may process the received total bandwidth usage from the user plane function node according to any suitable technique (e.g. the methods of FIGS. 14-15 described later). In some implementations of step 1110, the user plane function node may send one or more messages which indicate the total bandwidth usages of some of all of the predefined service classifications associated with some or all of the predefined types of the communication resource (e.g. in a list), and/or including the total bandwidth usages of some or all of the predefined service subclassifications associated with some or all of the predefined subtypes (e.g. in a list).

Figure 12:
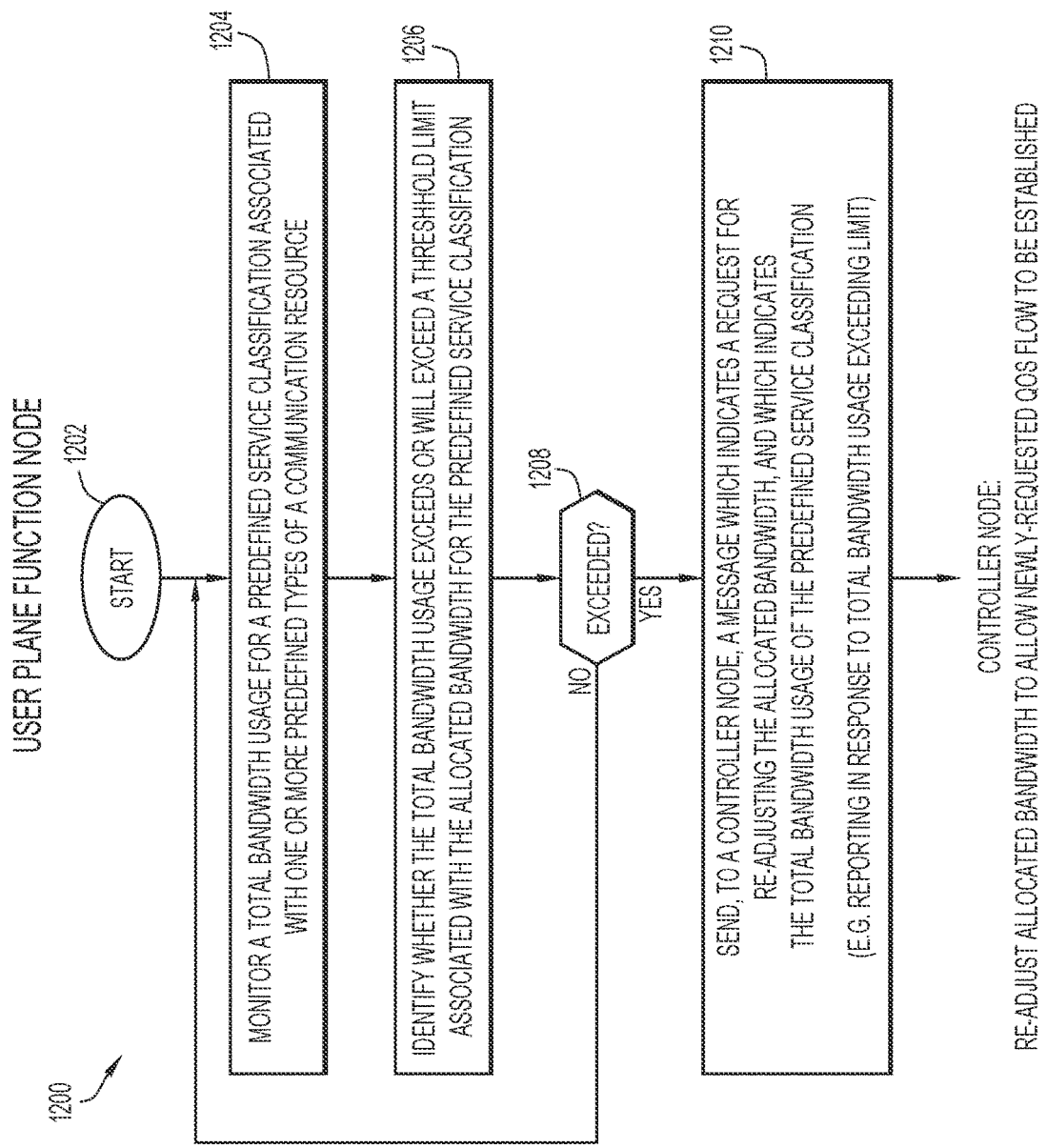

In the flowchart 1200 of FIG. 12, at a start block 1202, the user plane function node may monitor a total bandwidth usage for a predefined service classification associated with one or more predefined types of a communication resource at a user plane function node (step 1204 of FIG. 12). The total bandwidth usage that is monitored may be consumed from simultaneously-maintained QoS Flows routed via the user plane function node. The user plane function node may check to identify whether the total bandwidth usage exceeds or will exceed a threshold limit associated with the allocated bandwidth for the predefined service classification (step 1206 of FIG. 12). Based on identifying that the total bandwidth usage does not or will not exceed the threshold limit (step 1208 of FIG. 12), the user plane function node may continue to monitor (again step 1204) and to check/identify (again step 1206). In repeated steps 1204 and 1206, a real-time total bandwidth usage may be monitored. Based on identifying that the total bandwidth usage does or will exceed the threshold limit (again step 1208), the user plane function node may send, to a controller node, a message which indicates a request for readjusting the allocated bandwidth for the predefined service classification, and indicates the total bandwidth usage of the predefined service classification (step 1210 of FIG. 12). The controller node may process the received total bandwidth usage from the user plane function node according to any suitable technique (e.g. the methods of FIGS. 14-15 described later), which may include readjusting the allocated bandwidth (e.g. involving re-configuration(s) of allocated bandwidth(s), as in FIGS. 4-5). In some implementations of step 1210, the user plane function node may send one or more messages which indicate the request for readjusting the allocated bandwidth for the predefined service classification, and further indicate the total bandwidth usages of some of all of the predefined service classifications associated with some or all of the predefined types of the communication resource (e.g. in a list), and/or including the total bandwidth usages of some or all of the predefined service subclassifications associated with some or all of the predefined subtypes (e.g. in a list).

Figure 13:
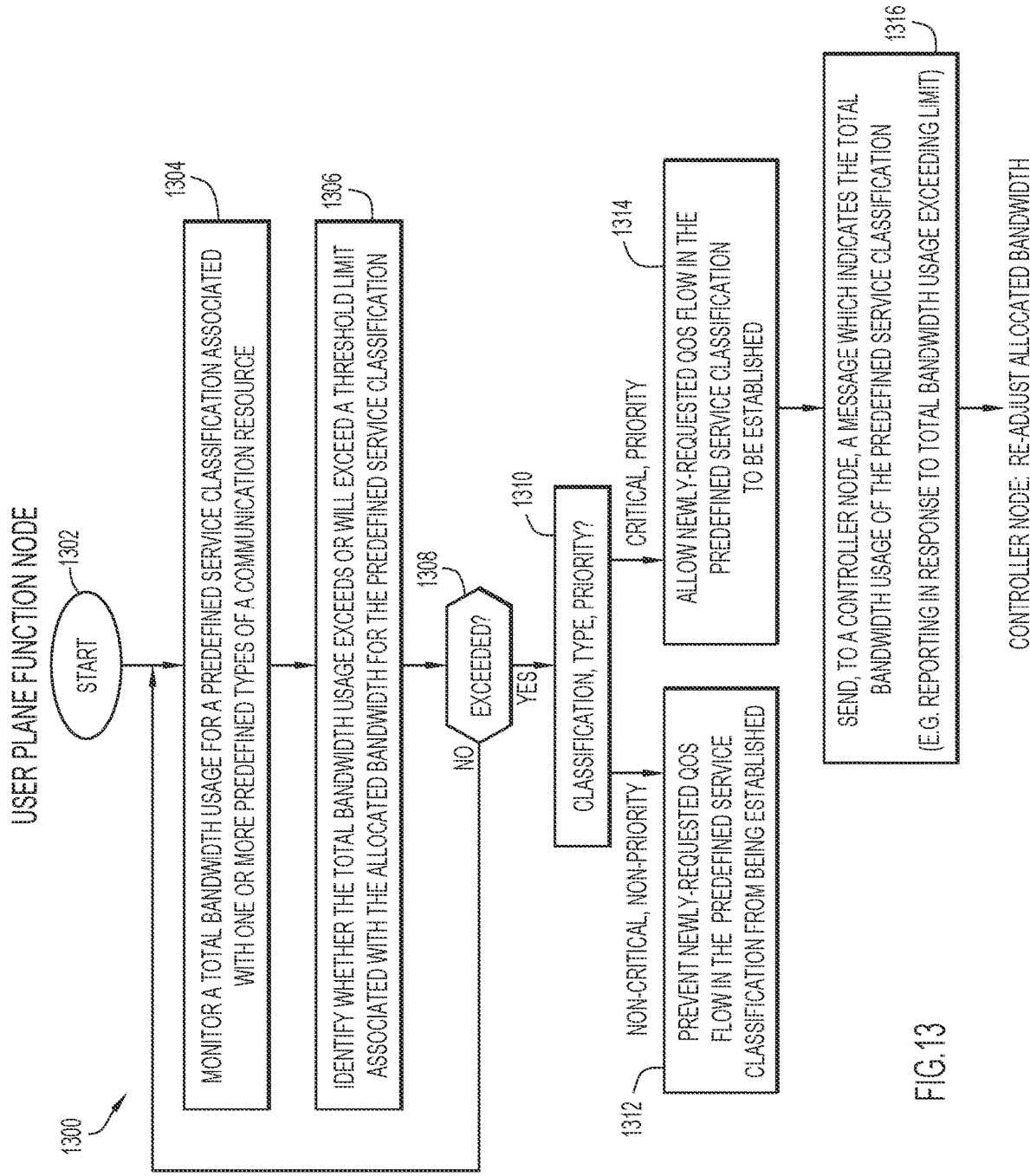

In the flowchart 1300 of FIG. 13, at a start block 1302, the user plane function node may monitor a total bandwidth usage for a predefined service classification associated with one or more predefined types of a communication resource at a user plane function node (step 1304 of FIG. 13). The total bandwidth usage that is monitored may be consumed from simultaneously-maintained QoS Flows routed via the user plane function node. The user plane function node may check to identify whether the total bandwidth usage exceeds or will exceed a threshold limit associated with the allocated bandwidth for the predefined service classification (step 1306 of FIG. 13). Based on identifying that the total bandwidth usage does not or will not exceed the threshold limit (step 1308 of FIG. 13), the user plane function node may continue to monitor (again step 1304) and to check/identify (again step 1306). In repeated steps 1304 and 1306, a real-time total bandwidth usage may be monitored. Based on identifying that the total bandwidth usage does or will exceed the threshold limit (again step 1308), the user plane function node may check the classification, type, and/or priority (step 1310 of FIG. 13). Based on identifying that the classification, type, or priority is of a first type (e.g. associated with a non-critical service or application, and/or a non-priority service or application) (as identified in step 1310), the user plane function node may prevent a newly-requested QoS Flow in the predefined service classification from being established (step 1312 of FIG. 13). Based on identifying that the classification, type, or priority is of a second type (e.g. associated with a critical service or application, and/or a priority service or application) (again as identified in step 1310), the user plane function node may allow a newly-requested QoS Flow in the predefined service classification to be established (step 1314 of FIG. 13). In addition, the user plane function node may send, to a controller node, a message which indicates the total bandwidth usage of the predefined service classification (step 1316 of FIG. 13). In some implementations of step 1316, the message may indicate a request for readjusting the allocated bandwidth for the predefined service classification. The controller node may process the message and the received total bandwidth usage from the user plane function node according to any suitable technique (e.g. the method of FIG. 15 described later). In some implementations of step 1316, the user plane function node may send one or more messages which indicate the total bandwidth usages of some of all of the predefined service classifications associated with some or all of the predefined types of the communication resource (e.g. in a list), and/or including the total bandwidth usages of some or all of the predefined service subclassifications associated with some or all of the predefined subtypes (e.g. in a list).

Figure 14:
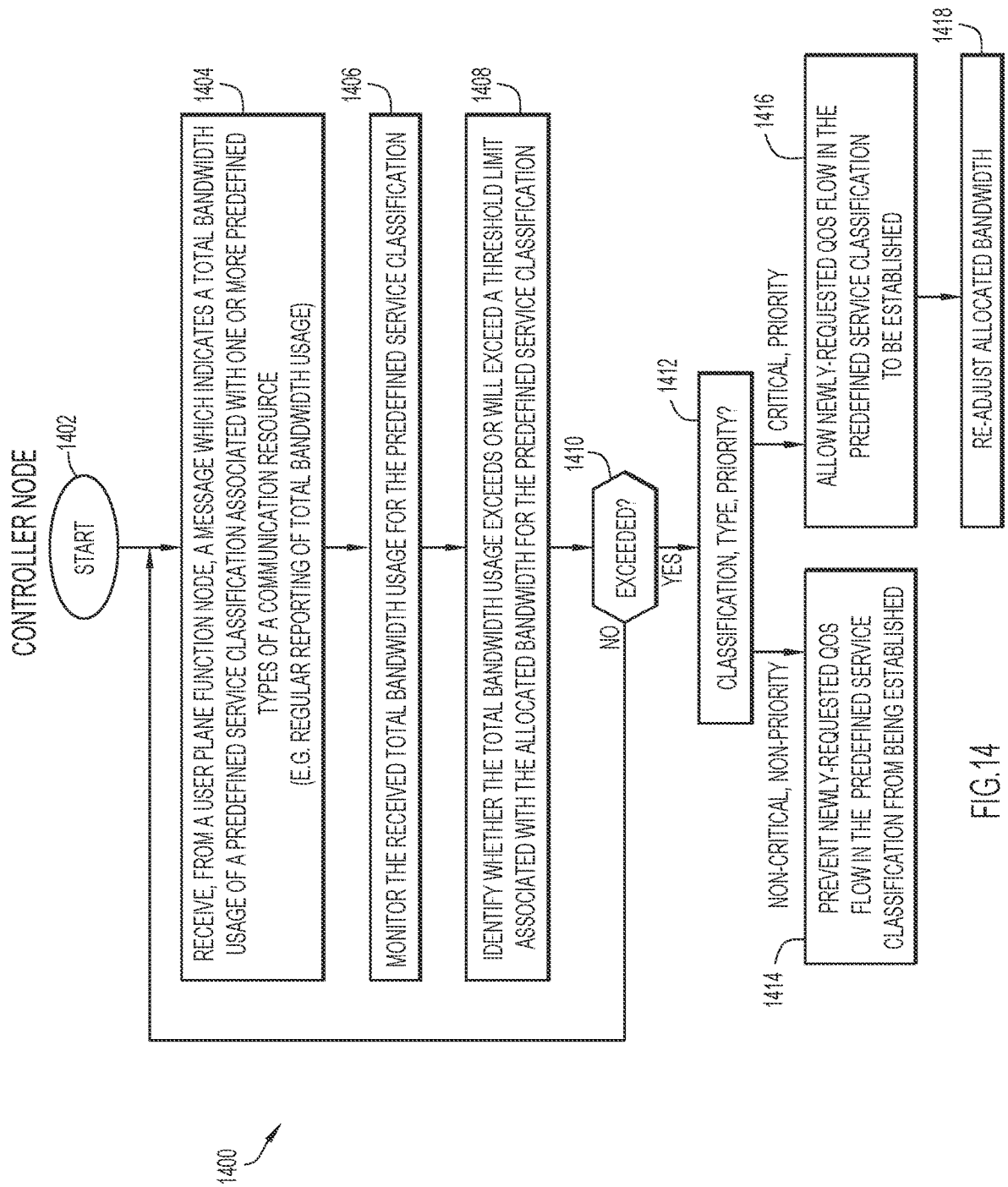
FIGS. 14 and 15 are flowcharts for describing methods of a controller node for managing use of a communication resource at the user plane function node based on configurations of allocated bandwidths for different predefined service classifications according to some implementations of the present disclosure.
Figure 15:
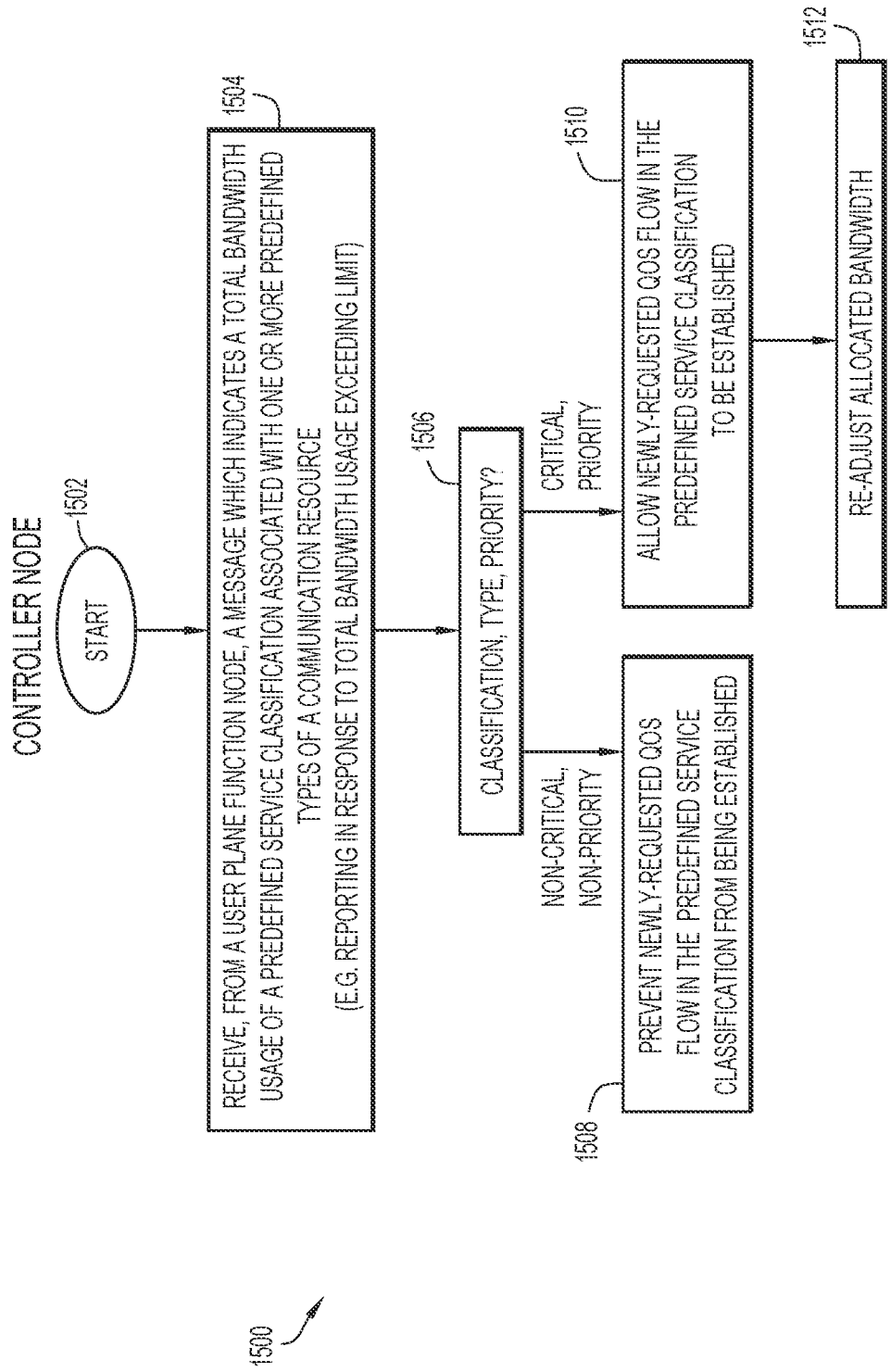

FIGS. 14 and 15 are flowcharts 1400 and 1500, respectively, for describing methods of a controller node for managing use of a communication resource at a user plane function node based on configurations of allocated bandwidths for different predefined service classifications according to some implementations of the present disclosure. Each one of the methods of FIGS. 14-15 may be performed for each one of a plurality of different predefined service classifications associated with one or more different predefined types of the communication resource (e.g. with use of parallel or serial processing). The methods may be performed by a controller node, with use of a system including the controller node and the user plane function node. In some implementations of these methods, the configuration of allocated bandwidth for the predefined service classification may be associated with a set of parameters that are configured in the user plane function node, which may include one or more of an allocated bandwidth value, a threshold limit value, and a priority value; each one of some or all of these parameters may be a relative value or percentage value. In some implementations, the different predefined types of the communication resource at the user plane function node are comprised of different network slices at the user plane function node. In some other implementations, the different predefined types of the communication resource at the user plane function node are comprised of different QoS Flow resource types (e.g. including GBR types and non-GBR types) of QoS Flows at the user plane function node. In yet some other implementations, the different predefined types of the communication resource at the user plane function node are comprised of different GBR QoS Flow types of QoS Flows at the user plane function node.

In the flowchart 1400 of FIG. 14, at a start block 1402, the controller node may receive, from a user plane function node, a message which indicates a total bandwidth usage for a predefined service classification associated with one or more predefined types of a communication resource at a user plane function node (step 1404 of FIG. 14). The controller node may monitor this total bandwidth usage for the predefined service classification (step 1406 of FIG. 14). The total bandwidth usage that is received and monitored may be consumed from simultaneously-maintained QoS Flows routed via the user plane function node. The controller node may check to identify whether the total bandwidth usage exceeds or will exceed a threshold limit associated with the allocated bandwidth for the predefined service classification (step 1408 of FIG. 14). Based on identifying that the total bandwidth usage does not or will not exceed the threshold limit (step 1410 of FIG. 14), the controller node may continue to receive (again step 1404), to monitor (again step 1406), and to check/identify (again step 1408). In repeated steps 1404, 1406, and 1408, a real-time total bandwidth usage may be monitored. Based on identifying that the total bandwidth usage does or will exceed the threshold limit (step 1410 of FIG. 14), the controller node may check the classification, type, and/or priority (step 1412 of FIG. 14). Based on identifying that the classification, type, or priority is of a first type (e.g. associated with a non-critical service or application, and/or a non-priority service or application) (as identified in step 1412), the controller node may prevent a newly-requested QoS Flow in the predefined service classification from being established (step 1414 of FIG. 14). Based on identifying that the classification, type, or priority is of a second type (e.g. associated with a critical service or application, and/or a priority service or application) (again as identified in step 1412), the controller node may allow a newly-requested QoS Flow in the predefined service classification to be established (step 1416 of FIG. 14). In addition, the controller node may readjust the allocated bandwidth for the predefined service classification (step 1418 of FIG. 13), which may involve re-configuration(s) of allocated bandwidth(s), as in FIGS. 4-5. In some implementations of step 1404, the controller node may receive one or more messages which indicate the total bandwidth usages of some of all of the predefined service classifications associated with some or all of the predefined types of the communication resource (e.g. in a list), and/or including the total bandwidth usages of some or all of the predefined service subclassifications associated with some or all of the predefined subtypes (e.g. in a list).

In the flowchart 1500 of FIG. 15, at a start block 1502, the controller node may receive, from a user plane function node, a message which indicates a total bandwidth usage for a predefined service classification associated with one or more predefined types of a communication resource at a user plane function node (step 1504 of FIG. 15). The message may be received based on identifying that the total bandwidth usage exceeds or will exceed a threshold limit associated with the allocated bandwidth for the predefined service classification. The total bandwidth usage that is received and monitored may be consumed from simultaneously-maintained QoS Flows routed via the user plane function node. The controller node may check the classification, type, and/or priority (step 1506 of FIG. 15). Based on identifying that the classification, type, or priority is of a first type (e.g. associated with a non-critical service or application, and/or a non-priority service or application) (as identified in step 1506), the controller node may prevent a newly-requested QoS Flow in the predefined service classification from being established (step 1508 of FIG. 15). Based on identifying that the classification, type, or priority is of a second type (e.g. associated with a critical service or application, and/or a priority service or application) (again as identified in step 1506), the controller node may allow a newly-requested QoS Flow in the predefined service classification to be established (step 1510 of FIG. 15). In addition, the controller node may readjust the allocated bandwidth for the predefined service classification (step 1512 of FIG. 15), which may involve re-configuration(s) of allocated bandwidth(s), as in FIGS. 4-5. In some implementations of step 1504, the controller node may receive one or more messages which indicate the total bandwidth usages of some of all of the predefined service classifications associated with some or all of the predefined types of the communication resource (e.g. in a list), and/or including the total bandwidth usages of some or all of the predefined service subclassifications associated with some or all of the predefined subtypes (e.g. in a list).

Figure 16:
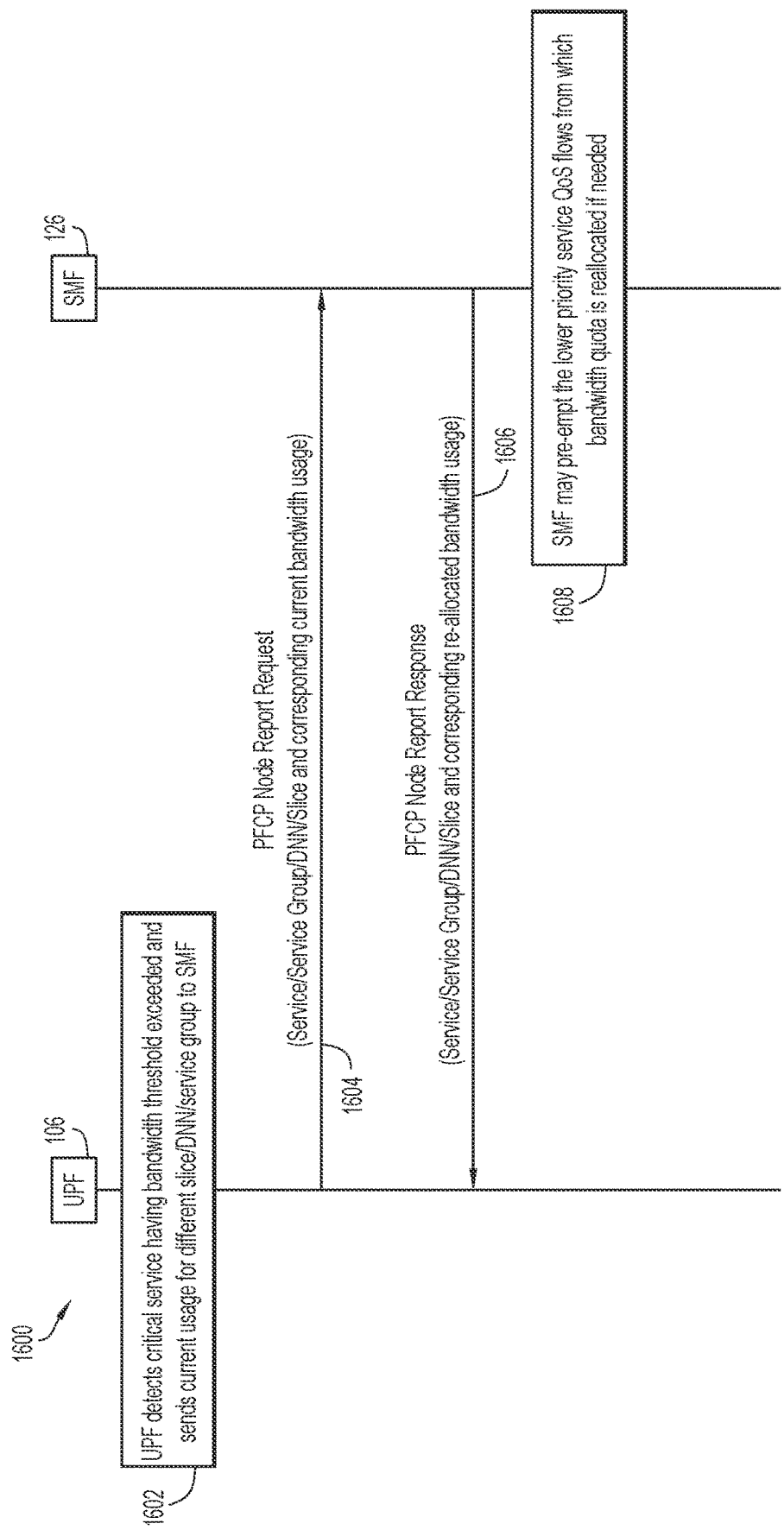
FIG. 16 is a call flow diagram of a call flow for describing a method for managing use of a communication resource at the user plane function node with use of a controller node which has a session management function (SMF), based on configurations of allocated bandwidths for different predefined service classifications according to some implementations of the present disclosure.

FIG. 16 is a call flow diagram 1600 of a call flow for describing a method for managing use of a communication resource at the user plane function node having a UPF based on configurations of allocated bandwidths for different predefined service classifications, with use of a controller node having an SMF, according to some implementations of the present disclosure.

In FIG. 16, UPF 106 may regularly monitor a total bandwidth usage for a predefined service classification associated with one or more predefined types of a communication resource at the UPF 106. This monitoring may be actually performed with respect to total bandwidth usages for each one of a plurality of different predefined service classifications associated with one or more different predefined types of the communication resource. UPF 106 may check to identify whether the total bandwidth usage exceeds or will exceed a threshold limit associated with the allocated bandwidth for the predefined service classification. Based on identifying that the total bandwidth usage does or will exceed the threshold limit (step 1602 of FIG. 16) (e.g. for a critical service or application), UPF 106 may send, to SMF 126, a message which indicates a PFCP Node Report Request (step 1604 of FIG. 16). This request may include an explicit or implicit request for readjusting the allocated bandwidth for the predefined service classification. The message may also indicate the total bandwidth usage of the predefined service classification. In some implementations of step 1604, UPF 106 may send one or more messages which indicate the total bandwidth usages of some of all of the predefined service classifications associated with some or all of the predefined types of the communication resource (e.g. in a list), and/or including the total bandwidth usages of some or all of the predefined service subclassifications associated with some or all of the predefined subtypes (e.g. in a list).

SMF 126 may receive and process the message and the received total bandwidth usage. This processing may include processing associated with the reallocations of the allocated bandwidths of the predefined service classifications. SMF 126 may send, to UPF 106, a message which indicates a PFCP Node Report Response (step 1606 of FIG. 16). This response may include an explicit or implicit request to readjust or reconfigure the allocated bandwidth associated with the predefined service classification. The message may also indicate the readjusted allocated bandwidth for the predefined service classification. In some implementations of step 1606, SMF 126 may send one or more messages which indicate the readjusted allocated bandwidths of some of all of the predefined service classifications associated with some or all of the predefined types of the communication resource (e.g. in a list), and/or including the readjusted allocated bandwidths of some or all of the predefined service subclassifications associated with some or all of the predefined subtypes (e.g. in a list). SMF 126 may proceed to perform any pre-emption of lower-priority QoS Flows if needed (step 1608 off FIG. 16). See e.g. FIG. 18 described below.

Figure 17:
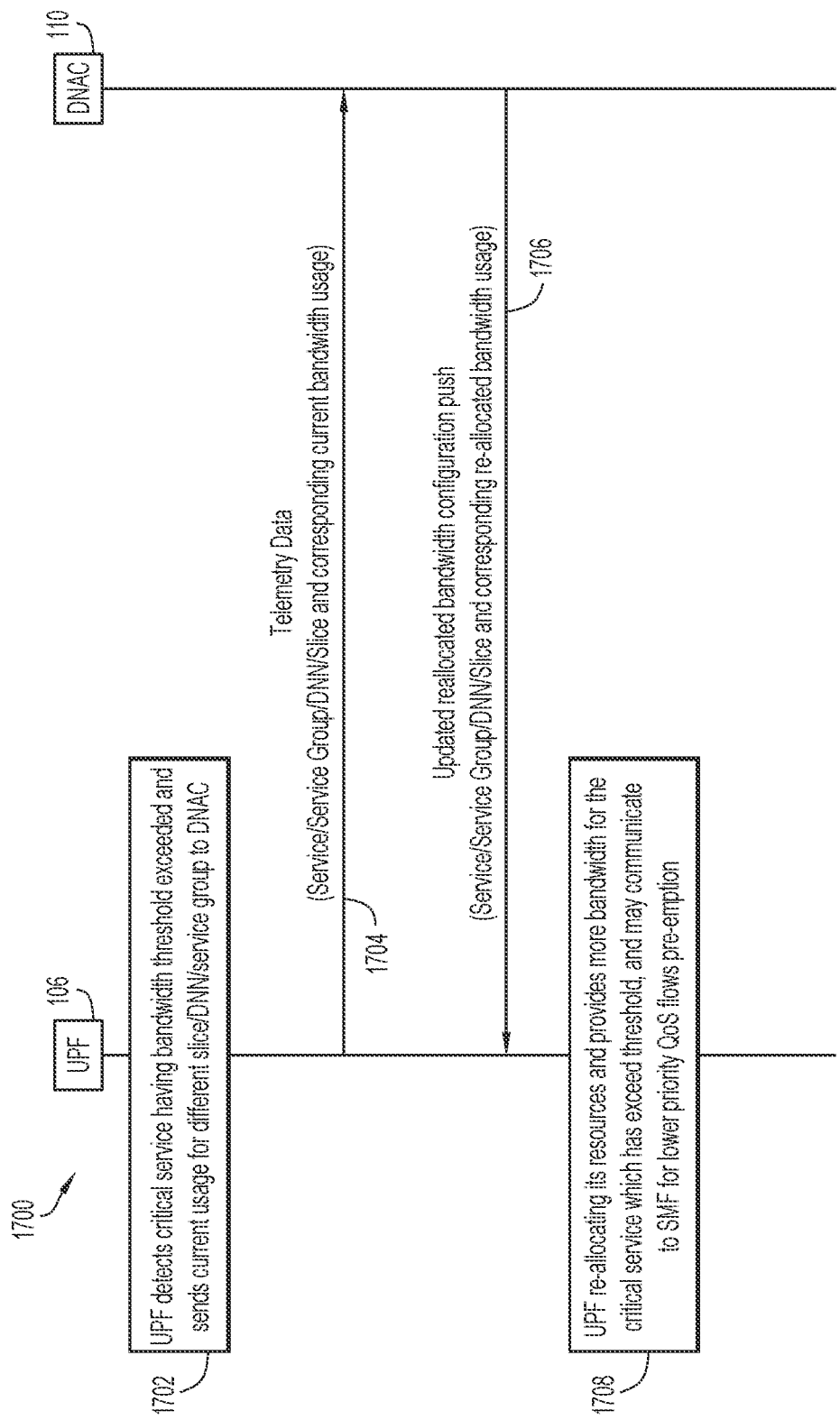
FIG. 17 is a call flow diagram of a call flow for describing a method for managing use of a communication resource at the user plane function node with use of a controller node which is or includes a network management cloud controller, based on configurations of allocated bandwidths for different predefined service classifications according to some implementations of the present disclosure.

FIG. 17 is a call flow diagram 1700 of a call flow for describing a method for managing use of a communication resource at the user plane function node with use of a controller node which is or includes a network controller or network management cloud controller (e.g. DNAC), based on configurations of allocated bandwidths for different predefined service classifications according to some implementations of the present disclosure.

In FIG. 17, UPF 106 may regularly monitor a total bandwidth usage for a predefined service classification associated with one or more predefined types of a communication resource at the UPF 106. This monitoring may be actually performed with respect to total bandwidth usages for each one of a plurality of different predefined service classifications associated with one or more different predefined types of the communication resource. UPF 106 may check to identify whether the total bandwidth usage exceeds or will exceed a threshold limit associated with the allocated bandwidth for the predefined service classification. Based on identifying that the total bandwidth usage does or will exceed the threshold limit (step 1702 of FIG. 17) (e.g. for a critical service or application), UPF 106 may send, to network controller 110, one or more messages comprising telemetry data for readjusting the allocated bandwidth for the predefined service classification (step 1704 of FIG. 17). The message may indicate the total bandwidth usage of the predefined service classification. In some implementations of step 1704, UPF 106 may send the one or more messages which indicate the total bandwidth usages of some of all of the predefined service classifications associated with some or all of the predefined types of the communication resource (e.g. in a list), and/or including the total bandwidth usages of some or all of the predefined service subclassifications associated with some or all of the predefined subtypes (e.g. in a list).

Network controller 110 may receive and process the one or more messages and the received total bandwidth usage. This processing may include processing associated with reallocations of the allocated bandwidths of the predefined service classifications. Network controller 110 may send, to UPF 106, one or more messages for readjusting or reconfiguring the allocated bandwidth associated with the predefined service classification (step 1706 of FIG. 17). The one or more messages may indicate the readjusted allocated bandwidth for the predefined service classification, as part of a reconfiguration "push." In some implementations of step 1706, network controller 110 may send one or more messages which indicate the readjusted allocated bandwidths of some of all of the predefined service classifications associated with some or all of the predefined types of the communication resource (e.g. in a list), and/or including the readjusted allocated bandwidths of some or all of the predefined service subclassifications associated with some or all of the predefined subtypes (e.g. in a list). UPF 106 may re-allocate its resources, providing more bandwidth for the critical service or application, and may communicate with SMF 126 to perform any pre-emption of lower-priority QoS Flows if needed (step 1708 off FIG. 17) (see e.g. FIG. 18 described below).

As described earlier above, the techniques and mechanisms of the present disclosure may be utilized with or without QoS Flow management procedures that provide at least some level of control and/or management by the UPF. Several different techniques for control and/or management of allocated bandwidths at the UPF were described above (e.g. in relation to FIGS. 10-13 and 14-15) considering these different control and management possibilities. The QoS Flow management procedures that provide at least some level of control and/or management by the UPF are now described in relation to FIGS. 18-20.

Figure 18:
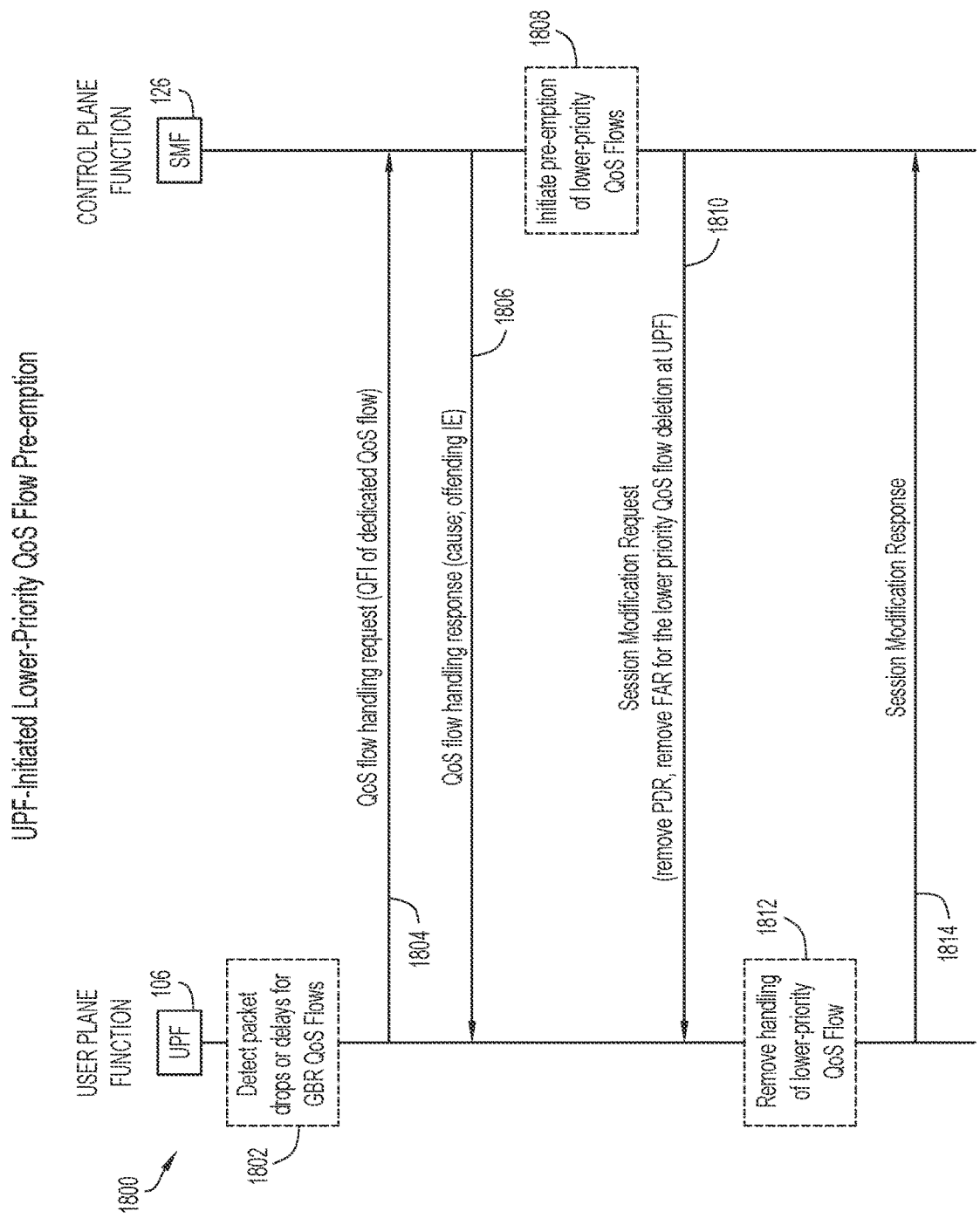
FIG. 18 is a call flow diagram for describing a call flow for QoS resource management for optimizing use of QoS resources in a private 5G network (e.g. a UPF-triggered QoS Flow pre-emption procedure) which may be utilized in at least some implementations of the techniques and mechanisms of the present disclosure.

FIG. 18 is a call flow diagram 1800 for describing a call flow for QoS resource management for supporting QoS guarantees in a mobile network (e.g. the private 5G network of FIGS. 1A-1B). In some implementations, the call flow of FIG. 18 may be and/or be referred to as a UPF-initiated lower-priority QoS Flow pre-emption procedure. The call flow may be utilized with techniques and mechanisms of the present disclosure for readjusting and reallocating bandwidths, depending on what level of control the UPF may be provided. In some implementations, steps 1802, 1804, and 1806 described below may be substituted with steps including the UPF detection of the total bandwidth usage exceeding the threshold limit and the UPF sending of a message which indicates the total bandwidth usage/excess for readjustment.

Initially, UPF 106 may operate to forward traffic for an application for a UE in a dedicated QoS Flow. The dedicated QoS Flow may be associated with at least one of a GBR, a GFBR, or a PDB. UPF 106 may monitor (regularly or continually) traffic for these types of flows for detecting packet drops or delays. Sometime during operation, UPF 106 detect a packet loss or delay associated with the traffic that is outside a limit set by a threshold value (step 1802 of FIG. 18). In some implementations, UPF 106 may determine, based on the detecting, that the GBR, GBFR, or PDB of the dedicated QoS Flow may have been (or e.g. has been) compromised. This determination may be indicative of congestion or overload at UPF 106. Again, this detection or determination may apply to those QoS Flows being maintained within their own limit (e.g. within its GBR limits).

In response, UPF 106 may send, to SMF 126 based on the detecting, a message which indicates a request for QoS Flow handling due to flow degradation (step 1804 of FIG. 18). In some implementations, the request may indicate or be referred to as a flow degradation notification. The message may include information associated with the dedicated QoS Flow. In some implementations, the information in the message of step 1804 may include at least a QFI associated with the dedicated QoS Flow. In response to sending the message in step 1804, SMF 126 may send, to UPF 106, a message which indicates a response for the QoS Flow handling (step 1806 of FIG. 18). In some implementations, the message of step 1806 may merely serve as an acknowledgement to the message of step 1804.

In response to a determination that the GBR, GBFR, or PDB of the dedicated QoS Flow may have been (or e.g. has been) compromised, SMF 126 may initiate a function for pre-emption of lower-priority QoS Flows (step 1808 of FIG. 18), for supporting the QoS guarantee for the existing dedicated QoS Flow. Here, SMF 126 may select one of a plurality of (other) QoS Flows routed via UPF 106, for deletion or for modification (downgrading or lowering) of its QoS. In one example, SMF 126 may select a lower-priority QoS Flow that has a lower priority than the dedicated QoS Flow and/or other QoS Flows routed via UPF 106. SMF 126 may send, to UPF 106, a message which indicates a session modification request, for deleting the selected QoS Flow or for modifying (downgrading or lowering) a QoS of the selected QoS Flow (step 1810 of FIG. 18). UPF 106 may receive the message of step 1810. In response, UPF 106 may delete or modify one or more rules of the selected QoS Flow (step 1812 of FIG. 18). UPF 106 may send, to SMF 126, a message which indicates a session modification response (step 1814 of FIG. 18). The deleting or downgrading of the selected QoS Flow may serve to alleviate or reduce the congestion or overload condition at UPF 106. In preferred cases, the deleting or downgrading of the selected (e.g. lower-priority) QoS Flow serves to reduce or eliminate the flow degradation of the dedicated QoS Flow.

Figure 19:
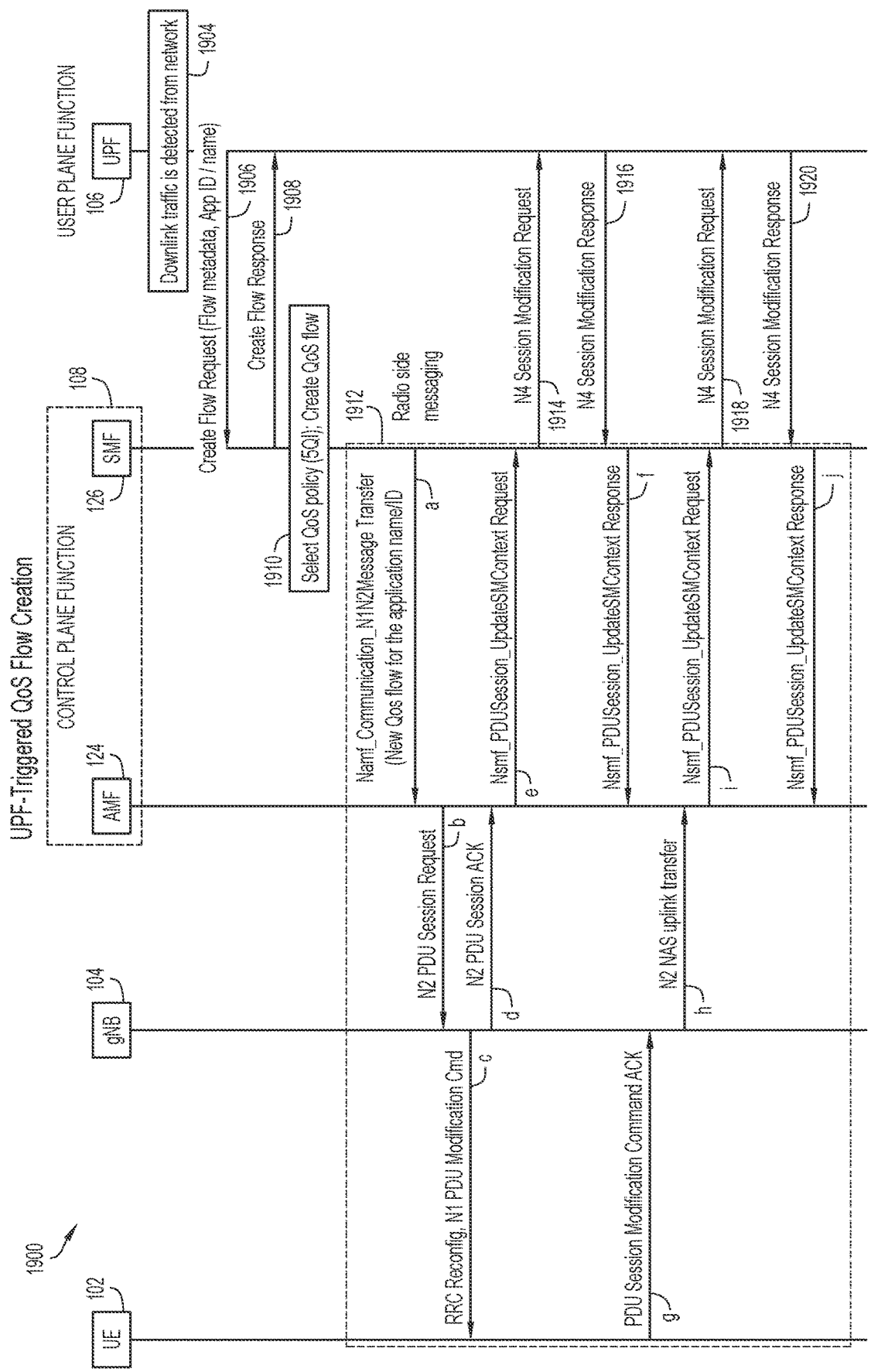
FIG. 19 is a call flow diagram for describing a call flow for QoS resource management for optimizing use of QoS resources in a private 5G network (e.g. a UPF-triggered QoS Flow creation procedure) which may be utilized in at least some implementations of the techniques and mechanisms of the present disclosure.

FIG. 19 is a call flow diagram 1900 for describing a call flow for QoS resource management for optimizing use of QoS resources in a mobile network (e.g. the private 5G network of FIGS. 1A-1B) according to some implementations of the present disclosure. In some implementations, the call flow of FIG. 19 may be and/or be referred to as a UPF-triggered QoS Flow creation procedure. The call flow may be utilized with techniques and mechanisms of the present disclosure, depending on what level of control and/or management the UPF is provided (e.g. for allowing or preventing new QoS Flows from being established based on the total bandwidth usage and allocated bandwidth, readjusting and reallocating bandwidths, etc.).

In general, UPF 106 operates to forward traffic for applications for UEs operating in a mobile network. Initially, however, no current dedicated QoS Flow is established for traffic for an application for a particular UE (i.e. UE 102) which operates in the mobile network. Sometime during operation, UPF 106 may detect traffic for the application for UE 102 for which no current dedicated QoS Flow is established (step 1904 of FIG. 19). Again, such detection of traffic may be (e.g. only) for those applications that SMF 126 configures or provisions at UPF 106 (e.g. pre-configured application identifiers for enterprise-aware or approved applications). UPF 106 may forward this (e.g. initial or startup) traffic in a default QoS Flow of UE 102 (e.g. a previously-established default QoS Flow). In response to the detection of the traffic, UPF 106 may send, to SMF 126, a message which indicates a request for creating a dedicated QoS Flow for traffic for the application for UE 102 (step 1906 of FIG. 19). The message may include flow metadata (e.g. n-tuple flow metadata) and an application identifier obtained in detecting the initial traffic. The detection at UPF 106 may involve the use of DPI or the like. SMF 126 may receive this message and send, to UPF 106, a message which indicates a response to creating the dedicated QoS Flow (step 1908 of FIG. 19). In some implementations, the message of this step may merely serve as an acknowledgement to the message.

Then, a new dedicated QoS Flow may be created for the traffic for the application for UE 102, which may be based on a selected QoS policy associated with the application identifier. For creating the dedicated QoS Flow, SMF 126 may select one of a plurality of QoS policies based on the application identifier (step 1910 of FIG. 19). The selected QoS policy may be associated with one of a plurality of different 5QIs. In some implementations, SMF 126 may select the QoS policy based on the application identifier by consulting the mapping which is stored in memory. SMF 126 may perform radio-side messaging for creating the dedicated QoS Flow, sending one or more radio-side messages for creating the dedicated QoS Flow, which extends to UE 102 via a base station (e.g. gNB 104) to UPF 106 (step 1912 of FIG. 19). The one or more messages may include an SDF filter for UE 102, which may be generated based on the flow metadata (e.g. n-tuple flow metadata) and the application identifier.

Radio-side messaging for QoS Flow creation is now generally described. SMF 126 may initiate a Namf_Communication_N1N2Message Transfer towards AMF 124 (step "a" of FIG. 19). The message transfer may include a PDU Session Modification Command, and for example, the QFI and QoS profile for the new dedicated QoS Flow. AMF 124 may send to SMF 126 an acknowledgement data notification (not shown in FIG. 19). AMF 124 may then send an N2 PDU Session Request message to gNB 104 (step "b" of FIG. 19). This message may include an N1 Session Management (SM) container which carries the PDU Session Modification Command. The gNB 104 may issue a signaling exchange with UE 102 that is related with the information received from SMF 126. Here, an RRC Connection Reconfiguration may take place with UE 102 (e.g. transporting the N1 SM container to UE 102) for modifying resources related to the PDU session (step "c" of FIG. 19). The gNB 104 may acknowledge the N2 PDU Session Request by sending an N2 PDU Session Ack message to AMF 124 (step "d" of FIG. 19). AMF 124 may forward the N2 SM information to SMF 126 via an Nsmf_PDUSession_UpdateSMContext service operation (step "e" of FIG. 19). SMF 126 may reply with an Nsmf_PDUSession_UpdateSMContext Response (step "f" of FIG. 19).

With respect to UPF 106, SMF 126 may update the N4 session of UPF 106 by sending an N4 Session Modification Request (step 1914 of FIG. 19). This may be for configuring one or more rules of the selected QoS policy at UPF 106 for the dedicated QoS Flow. For example, SMF 126 may update UPF 106 with one or more UL PDRs for the new dedicated QoS Flow. This may allow UL packets with the QFI of the new QoS Flow to be communicated. UPF 106 may reply with an N4 Session Modification Response (step 1916 of FIG. 19).

Continuing with the radio-side messaging after step "f", UE 102 may acknowledge the PDU Session Modification Command from step "c" by sending a NAS message to gNB 104 (step "g" of FIG. 19), which forwards the NAS message to AMF 124 (step "h" of FIG. 19). AMF 124 forwards the N1 SM container (e.g. including the PDU Session Modification Command Ack) to SMF 126 via an Nsmf_PDUSession_UpdateSMContext service operation (step "i" of FIG. 19). SMF 126 may reply with a Nsmf_PDUSession_UpdateSMContext Response (step "j" of FIG. 19).

With respect to UPF 106, SMF 126 may again update the N4 session of UPF 106 by sending an N4 Session Modification Request (step 1918 of FIG. 19). UPF 106 may reply with an N4 Session Modification Response (step 1920 of FIG. 19).

Figure 20:
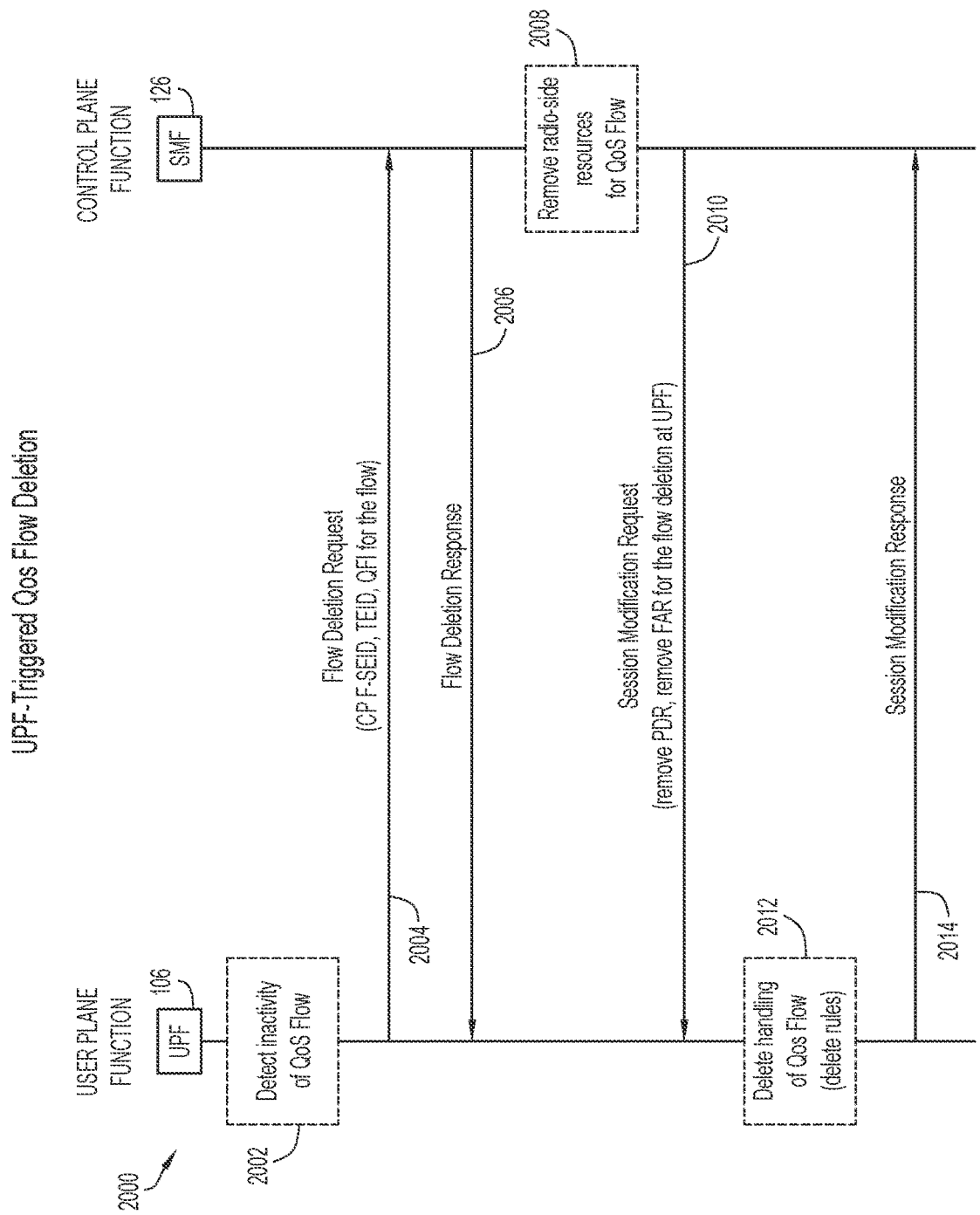
FIG. 20 is a call flow diagram for describing a call flow for QoS resource management for optimizing use of QoS resources in a private 5G network (e.g. a UPF-triggered QoS Flow deletion procedure) which may be utilized in at least some implementations of the techniques and mechanisms of the present disclosure.

FIG. 20 is a call flow diagram 2000 for describing a call flow for QoS resource management for optimizing use of QoS resources in a mobile network (e.g. the private 5G network of FIGS. 1A-1B) according to some implementations of the present disclosure. In some implementations, the call flow of FIG. 20 may be and/or be referred to as a UPF-triggered QoS Flow deletion procedure. Again, this call flow may be utilized with techniques and mechanisms of the present disclosure, depending on what level of control and/or management the UPF is provided (e.g. for allowing or preventing new QoS Flows from being established based on the total bandwidth usage and allocated bandwidth, readjusting and reallocating bandwidths, etc.).

Initially, UPF 106 may operate to forward traffic for an application for a UE in a dedicated QoS Flow. The dedicated QoS Flow may be associated with at least one of a GBR, a GFBR, or a PDB. UPF 106 may monitor traffic activity/inactivity in the dedicated QoS Flow. Based on the monitoring, UPF 106 may determine that a measured time period of (continuous) traffic inactivity for the dedicated QoS Flow is outside a limit set by a time period threshold (step 2002 of FIG. 20). In response to determining, UPF 106 may send, to SMF 126 based on the determining, a message which indicates a request for deleting the dedicated QoS Flow (step 2004 of FIG. 20). The message may include information associated with the dedicated QoS Flow for deletion. In some implementations, the information associated with the dedicated QoS Flow may include at least one of a QFI, a CP F-SEID, or a TEID associated with the dedicated QoS Flow. In response to receiving the message of step 2004, UPF 106 may receive, from SMF 126, a message which indicates a response to the deleting of the dedicated QoS Flow (step 2006 of FIG. 20). In some implementations, the message of step 2006 may merely serve as an acknowledgement to the message of step 2004.

In response to the message of step 2004, SMF 126 may send one or more radio-side messages for deleting the QoS Flow (step 2008 of FIG. 20). In some implementations, this procedure or its steps may involve a standard procedure for deletion of a QoS Flow. UPF 106 may then receive, from SMF 126, a message which indicates a session modification request for deleting the dedicated QoS Flow (step 2010 of FIG. 20). Again, SMF 126 may issue this request based on the information received in relation the request for deletion. UPF 106 may then remove the dedicated QoS Flow, which includes deleting the one or more rules for the dedicated QoS Flow (step 2012 of FIG. 20). For example, the one or more rules to be removed or deleted may include the PDR and/or the FAR. UPF 106 may send, to SMF 126, a message which indicates a session modification response (step 2014 of FIG. 20).

Thus, techniques and mechanisms for the configuration and use of allocated bandwidths for predefined service classifications associated with different predefined types of a communication resource at a UPF have been described. Advantageously, the techniques and mechanisms of the present disclosure help solve the problems pertaining to the over-subscription of bandwidth and congestion at the UPF. Customer experience and critical applications experience in enterprise private 5G are heavily dependent on proper QoS handling, and therefore the present techniques and mechanisms provides a notable differentiation to a private 5G offering.

Figure 21:
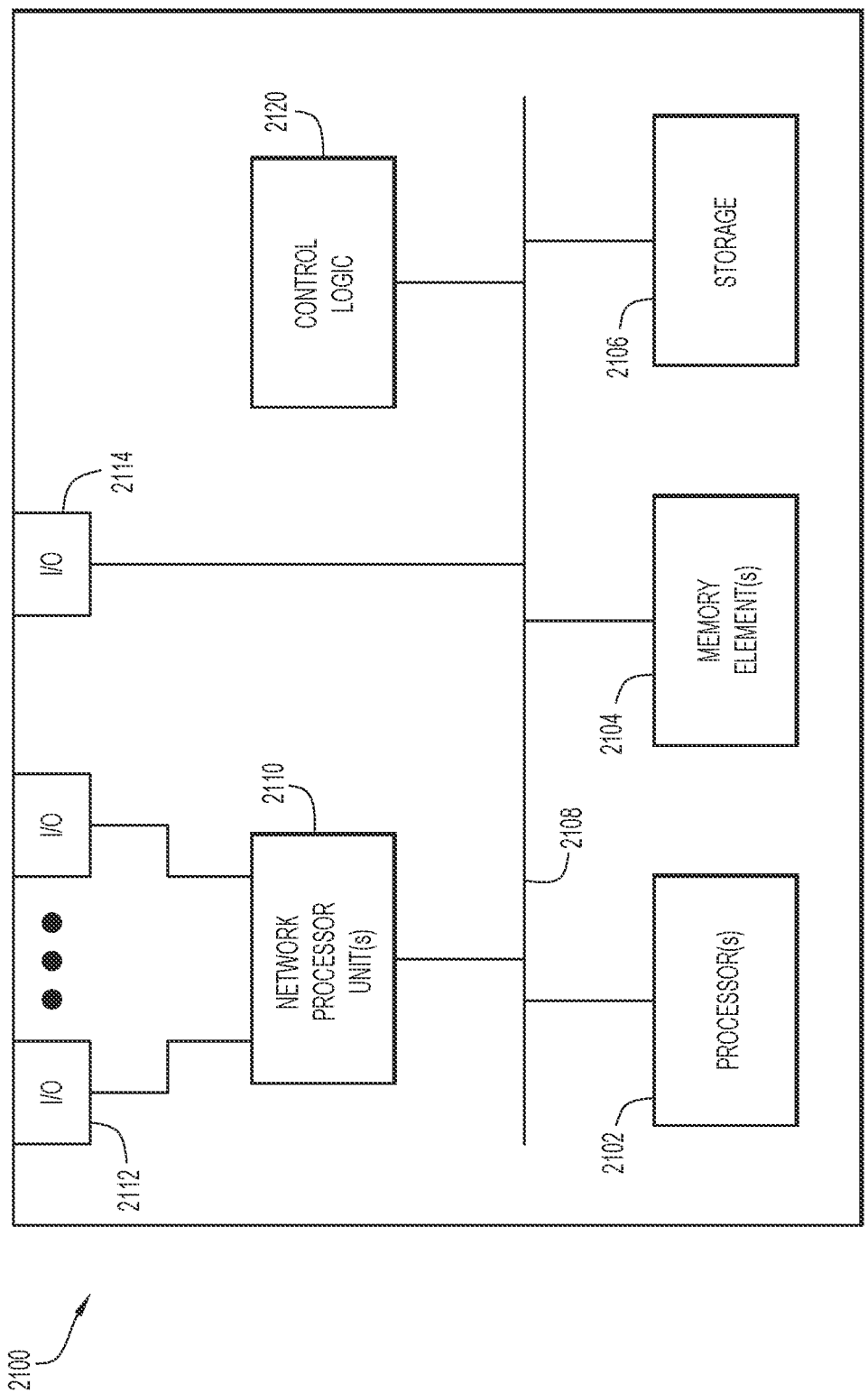
FIG. 21 illustrates a hardware block diagram of a computing device that may perform functions associated with operations discussed herein.

FIG. 21 illustrates a hardware block diagram of a computing device 2100 that may perform functions associated with operations discussed herein in connection with the techniques described in relation to the above figures. In various embodiments, a computing device, such as computing device 2100 or any combination of computing devices 2100, may be configured as any entity/entities as discussed for the techniques depicted in connection with the figures in order to perform operations of the various techniques discussed herein.

In at least one embodiment, the computing device 2100 may include one or more processor(s) 2102, one or more memory element(s) 2104, storage 2106, a bus 2108, one or more network processor unit(s) 2110 interconnected with one or more network input/output (I/O) interface(s) 2112, one or more I/O interface(s) 2114, and control logic 2120. In various embodiments, instructions associated with logic for computing device 2100 can overlap in any manner and are not limited to the specific allocation of instructions and/or operations described herein.

In at least one embodiment, processor(s) 2102 is/are at least one hardware processor configured to execute various tasks, operations and/or functions for computing device 2100 as described herein according to software and/or instructions configured for computing device 2100. Processor(s) 2102 (e.g., a hardware processor) can execute any type of instructions associated with data to achieve the operations detailed herein. In one example, processor(s) 2102 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 2104 and/or storage 2106 is/are configured to store data, information, software, and/or instructions associated with computing device 2100, and/or logic configured for memory element(s) 2104 and/or storage 2106. For example, any logic described herein (e.g., control logic 2120) can, in various embodiments, be stored for computing device 2100 using any combination of memory element(s) 2104 and/or storage 2106. Note that in some embodiments, storage 2106 can be consolidated with memory element(s) 2104 (or vice versa), or can overlap/exist in any other suitable manner.

In at least one embodiment, bus 2108 can be configured as an interface that enables one or more elements of computing device 2100 to communicate in order to exchange information and/or data. Bus 2108 can be implemented with any architecture designed for passing control, data and/or information between processors, memory elements/storage, peripheral devices, and/or any other hardware and/or software components that may be configured for computing device 2100. In at least one embodiment, bus 2108 may be implemented as a fast kernel-hosted interconnect, potentially using shared memory between processes (e.g., logic), which can enable efficient communication paths between the processes.

In various embodiments, network processor unit(s) 2110 may enable communication between computing device 2100 and other systems, entities, etc., via network I/O interface(s) 2112 to facilitate operations discussed for various embodiments described herein. In various embodiments, network processor unit(s) 2110 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 2100 and other systems, entities, etc. to facilitate operations for various embodiments described herein. In various embodiments, network I/O interface(s) 2112 can be configured as one or more Ethernet port(s), Fibre Channel ports, and/or any other I/O port(s) now known or hereafter developed. Thus, the network processor unit(s) 2110 and/or network I/O interface(s) 2112 may include suitable interfaces for receiving, transmitting, and/or otherwise communicating data and/or information in a network environment.

I/O interface(s) 2114 allow for input and output of data and/or information with other entities that may be connected to computer device 2100. For example, I/O interface(s) 2114 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 2120 can include instructions that, when executed, cause processor(s) 2102 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 2120) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 2104 and/or storage 2106 can store data, software, code, instructions (e.g., processor instructions), logic, parameters, combinations thereof, and/or the like used for operations described herein. This includes memory element(s) 2104 and/or storage 2106 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. IP addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

The invention claimed is:

1. A method comprising:
   at a user plane function node for use in a mobile network,
   receiving, from a controller node, a bandwidth configuration for an allocated bandwidth for a predefined service classification associated with one or more predefined types of a communication resource at the user plane function node, wherein the bandwidth configuration received from the controller node comprises a threshold limit value associated with the allocated bandwidth;
   monitoring, based on the bandwidth configuration, a total bandwidth usage for the predefined service classification associated with the one or more predefined types of the communication resource, consumed from simultaneously-maintained Quality of Service (QOS) flows routed via the user plane function node;
   identifying, based on the monitoring, whether the total bandwidth usage exceeds or will exceed the threshold limit value associated with the allocated bandwidth for the bandwidth configuration received by the user plane function;
   sending, to the controller node based on the identifying, a message that indicates the total bandwidth usage for the predefined service classification associated with the one or more predefined types of the communication resource; and
   receiving, from the controller node, a command to readjust the allocated bandwidth in response to sending the message.

2. The method of claim 1, wherein the receiving, the monitoring, and the identifying are performed for each one of a plurality of different predefined service classifications, each different predefined service classification being associated with a respective one of a plurality of different predefined types of the communication resource at the user plane function node.

3. The method of claim 2, wherein the plurality of different predefined types of the communication resource comprise a plurality of different network slices or data network names (DNNs) associated with the user plane function node.

4. The method of claim 2, wherein the plurality of different predefined types of the communication resource comprise a plurality of different QoS Flow resource types at the user plane function node, including Guaranteed Bit Rate (GBR) types and non-GBR types.

5. The method of claim 1, wherein
   the bandwidth configuration further comprises a priority value and a bandwidth allocation value.

6. The method of claim 1,
   wherein the sending of the message is based on identifying that the total bandwidth usage does exceed or will exceed the threshold limit associated with the allocated bandwidth.

7. The method of claim 1, wherein sending comprises sending the message which indicates a request for readjusting the allocated bandwidth for the predefined service classification.

8. The method of claim 1, further comprising:
   at the user plane function node,
      in response to sending the message, receiving, from the controller node, a re-configuration of the allocated bandwidth to a readjusted allocated bandwidth for the predefined service classification associated with the one or more predefined types of the communication resource.

9. The method of claim 1, wherein the user plane function node comprises a user plane function (UPF), and the controller node comprises a Session Management Function (SMF) or a network management cloud controller.

10. A network node comprising:
    one or more interfaces to connect in a mobile network;
    one or more processors; and
    one or more memory elements for storing instructions executable on the one or more processors for operation as a user plane function of the mobile network, the operation including:
       receiving, from a controller node, a bandwidth configuration for an allocated bandwidth for a predefined service classification associated with one or more predefined types of a communication resource, wherein the bandwidth configuration received from the controller node comprises a threshold limit value associated with the allocated bandwidth;
       monitoring, based on the bandwidth configuration, a total bandwidth usage for the predefined service classification associated with the one or more predefined types of the communication resource consumed from simultaneously-maintained Quality of Service (QOS) flows routed via the user plane function;
       identifying, based on the monitoring, whether the total bandwidth usage exceeds or will exceed the threshold limit value associated with the allocated bandwidth for the bandwidth configuration received by the user plane function;
       sending, to the controller node based on the identifying, a message that indicates the total bandwidth usage for the predefined service classification associated with the one or more predefined types of the communication resource; and
       receiving, from the controller node, a command to readjust the allocated bandwidth in response to sending the message.

11. The network node of claim 10, wherein the instructions are executable on the one or more processors for operation as the user plane function including the receiving, the monitoring, and the identifying that are performed for each one of a plurality of different predefined service classifications, each different predefined service classification being associated with a respective one of a plurality of different predefined types of the communication resource.

12. The network node of claim 11, wherein:
    the plurality of different predefined types of the communication resource comprise a plurality of different network slices or data network names (DNNs), or the plurality of different predefined types of the communication resource comprise a plurality of different QoS Flow resource types, including Guaranteed Bit Rate (GBR) types and non-GBR types.

13. The network node of claim 10, wherein
wherein sending the message is based on identifying that the total bandwidth usage does exceed or will exceed the threshold limit associated with the allocated bandwidth.

14. The network node of claim 10, wherein the instructions are executable on the one or more processors for operation as the user plane function including:
in response to sending the message, receiving, from the controller node, a re-configuration of the allocated bandwidth to a readjusted allocated bandwidth for the predefined service classification associated with the one or more predefined types of the communication resource.

15. The method of claim 1, the message sent to the controller node that indicates the total bandwidth usage for the predefined service classification associated with the one or more predefined types of the communication resource is a Packet Forwarding Control Protocol (PFCP) node report request message.

16. The method of claim 15, wherein the command received from the controller node to readjust the allocated bandwidth is a PFCP node report response message.

17. One or more non-transitory computer readable storage media encoded with instructions that, when executed by a processor of a user plane function of a mobile network, cause the processor to perform operations, comprising:
receiving, from a controller node, a bandwidth configuration for an allocated bandwidth for a predefined service classification associated with one or more predefined types of a communication resource, wherein the bandwidth configuration received from the controller node comprises a threshold limit value associated with the allocated bandwidth;
monitoring, based on the bandwidth configuration, a total bandwidth usage for the predefined service classification associated with the one or more predefined types of the communication resource consumed from simultaneously-maintained Quality of Service (QOS) flows routed via the user plane function;
identifying, based on the monitoring, whether the total bandwidth usage exceeds or will exceed the threshold limit value associated with the allocated bandwidth for the bandwidth configuration received by the user plane function;
sending, to the controller node based on the identifying, a message that indicates the total bandwidth usage for the predefined service classification associated with the one or more predefined types of the communication resource; and
receiving, from the controller node, a command to readjust the allocated bandwidth in response to sending the message.

18. The one or more non-transitory computer readable storage media of claim 17, wherein the receiving, the monitoring, and the identifying are performed for each one of a plurality of different predefined service classifications, each different predefined service classification being associated with a respective one of a plurality of different predefined types of the communication resource at the user plane function node.

19. The one or more non-transitory computer readable storage media of claim 18, wherein the plurality of different predefined types of the communication resource comprise a plurality of different network slices or data network names (DNNs) associated with the user plane function node.

20. The one or more non-transitory computer readable storage media of claim 18, wherein the plurality of different predefined types of the communication resource comprise a plurality of different QoS Flow resource types at the user plane function node, including Guaranteed Bit Rate (GBR) types and non-GBR types.

* * * * *